(12) United States Patent
Takeda

(10) Patent No.: US 7,936,650 B2
(45) Date of Patent: May 3, 2011

(54) ATTENUATION-AMOUNT ADJUSTING CIRCUIT, OPTICAL DISK DRIVE DEVICE, ATTENUATION-AMOUNT ADJUSTING METHOD, AND ADDRESS-INFORMATION ACQUIRING METHOD

(75) Inventor: Naoto Takeda, Tokyo (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 11/672,192

(22) Filed: Feb. 7, 2007

(65) Prior Publication Data

US 2007/0189146 A1 Aug. 16, 2007

(30) Foreign Application Priority Data

Feb. 14, 2006 (JP) .................................. 2006-036601

(51) Int. Cl.
*G11B 20/10* (2006.01)
(52) U.S. Cl. ............... 369/47.27; 369/44.13; 369/47.22; 369/124.12; 369/134; 369/277
(58) Field of Classification Search .................. None
See application file for complete search history.

(56) References Cited

U.S. PATENT DOCUMENTS

2002/0181357 A1* 12/2002 Iimura ....................... 369/47.22
2006/0109770 A1* 5/2006 Ogura et al. ............. 369/112.01

FOREIGN PATENT DOCUMENTS

JP 2002-334446 11/2002

* cited by examiner

*Primary Examiner* — Joseph Haley
*Assistant Examiner* — Ifedayo Iluyomade
(74) *Attorney, Agent, or Firm* — Oblon, Spivak, McClelland, Maier & Neustadt, L.L.P.

(57) ABSTRACT

An attenuation-amount adjusting circuit includes: a light irradiating unit that alternately irradiates a laser beam of a writing level and a laser beam of a readout level on an optical disk that has a groove formed by a wobble pattern and plural markers indicating physical positions in the groove; a light receiving unit that receives reflected light of the laser beam irradiated on the optical disk and converts the reflected light into a reproduction signal; and a writing-waveform attenuating unit that attenuates an amplitude level of a writing waveform corresponding to the reflected light of the laser beam of the writing level in the reproduction signal according to a position from a rising edge of the writing waveform.

15 Claims, 18 Drawing Sheets

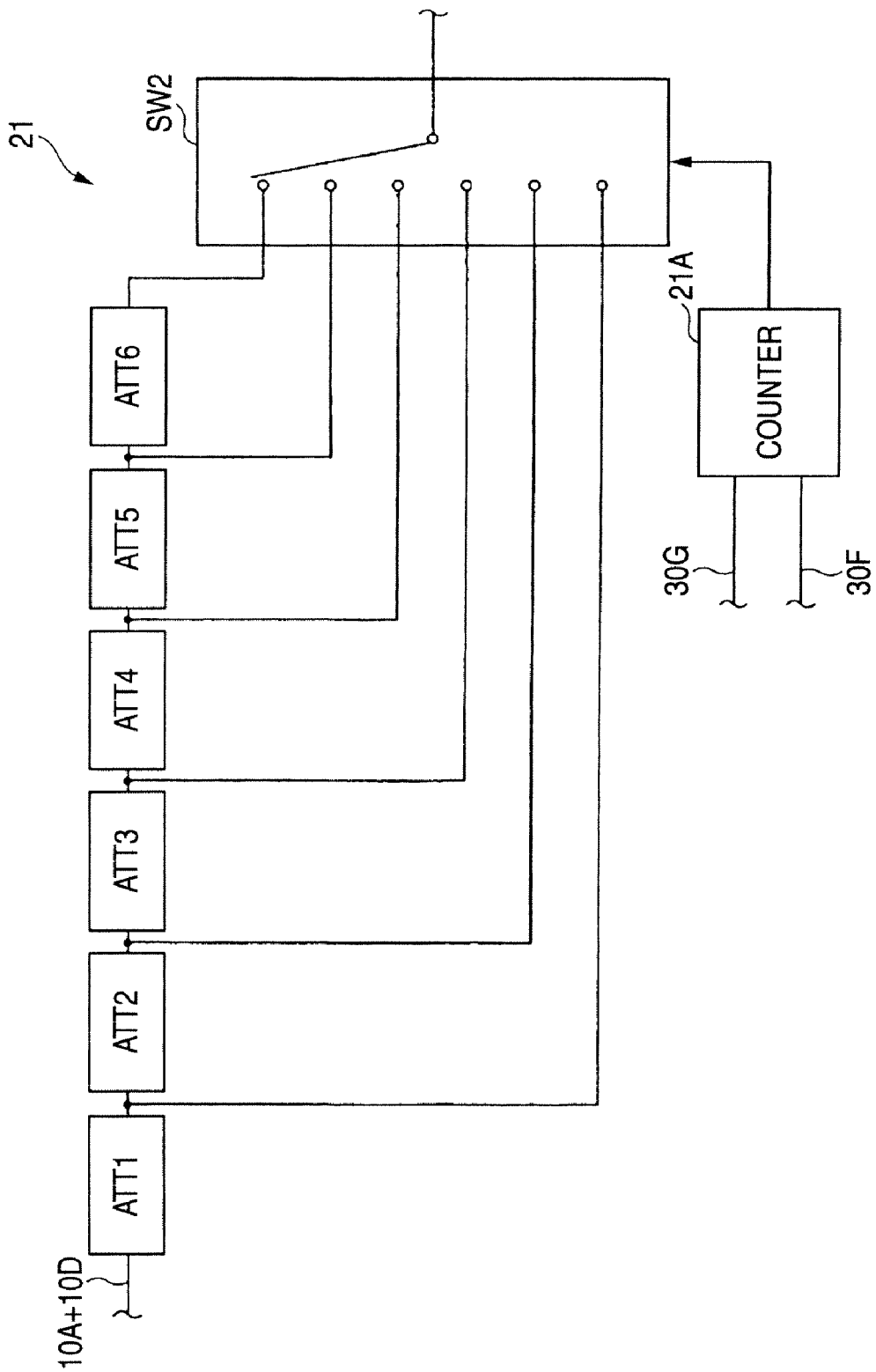

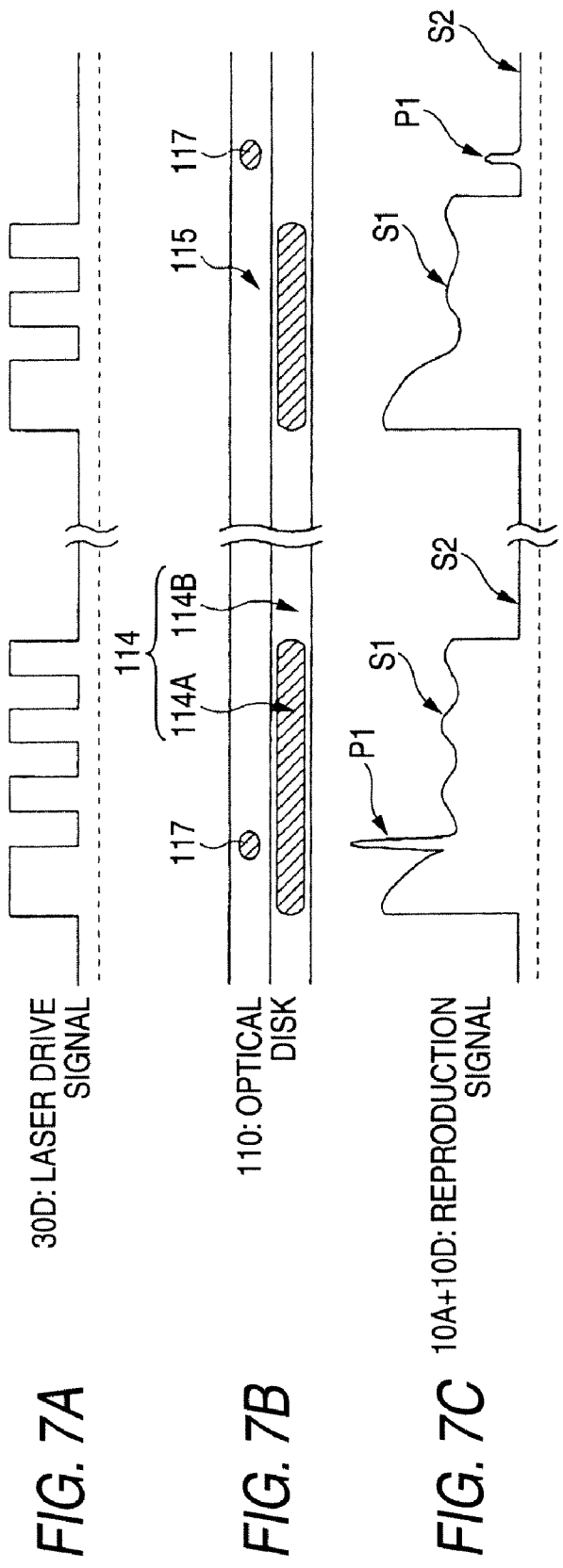

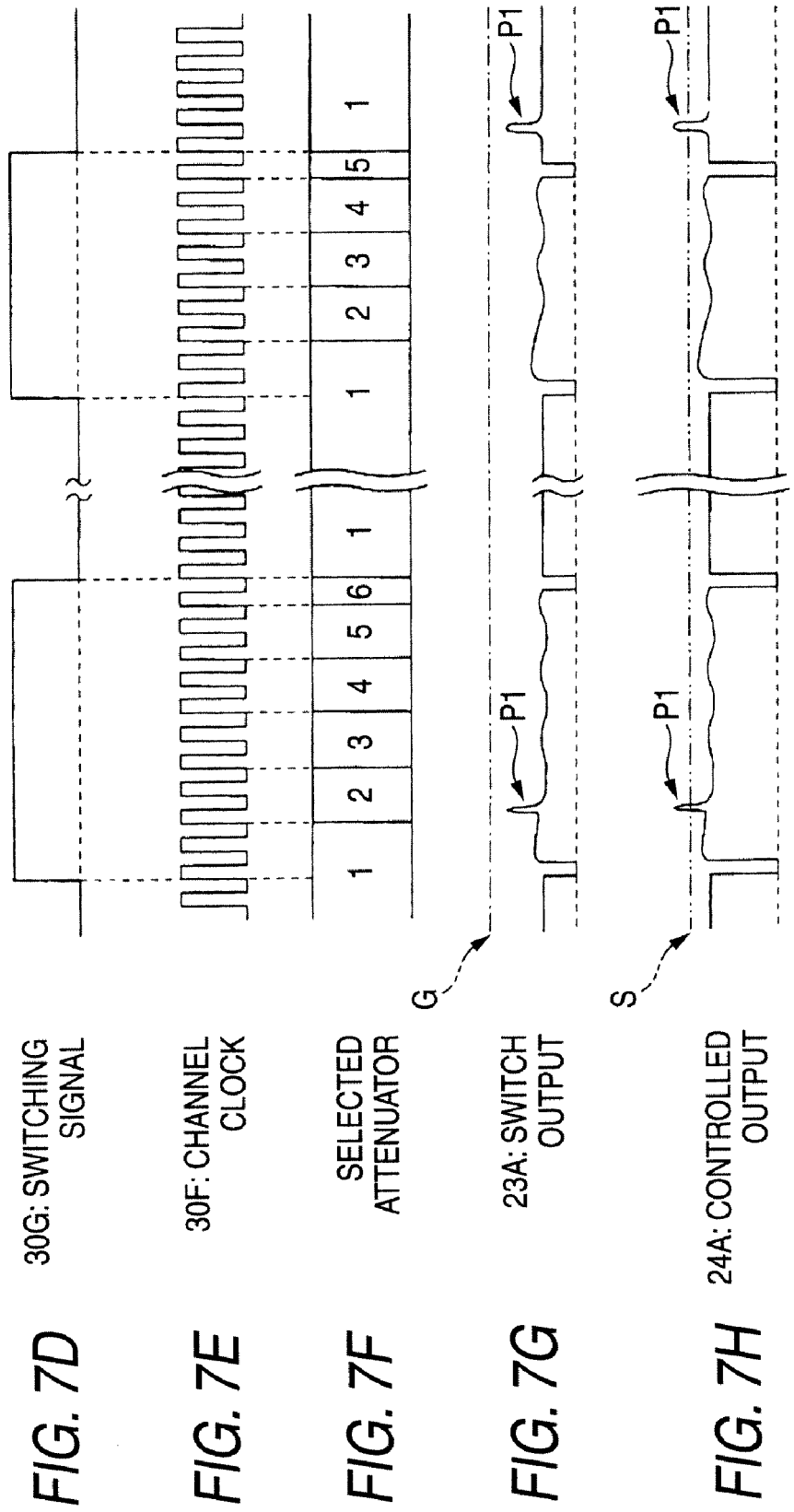

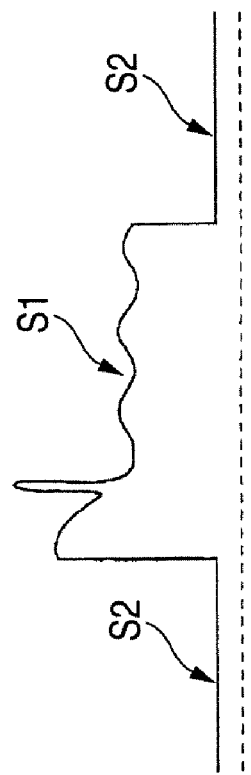
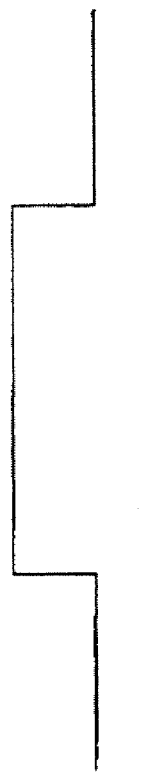
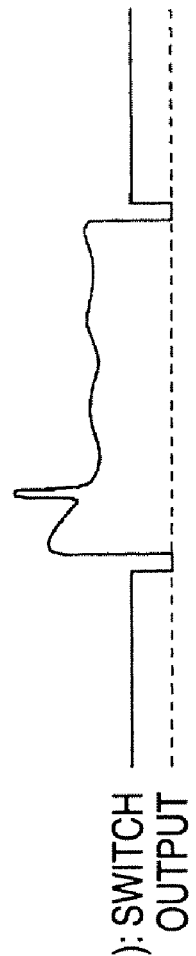
FIG. 10A  10A+10D: REPRODUCTION SIGNAL
FIG. 10B  30G: SWITCHING SIGNAL
FIG. 10C  23A (ATT7): SWITCH OUTPUT

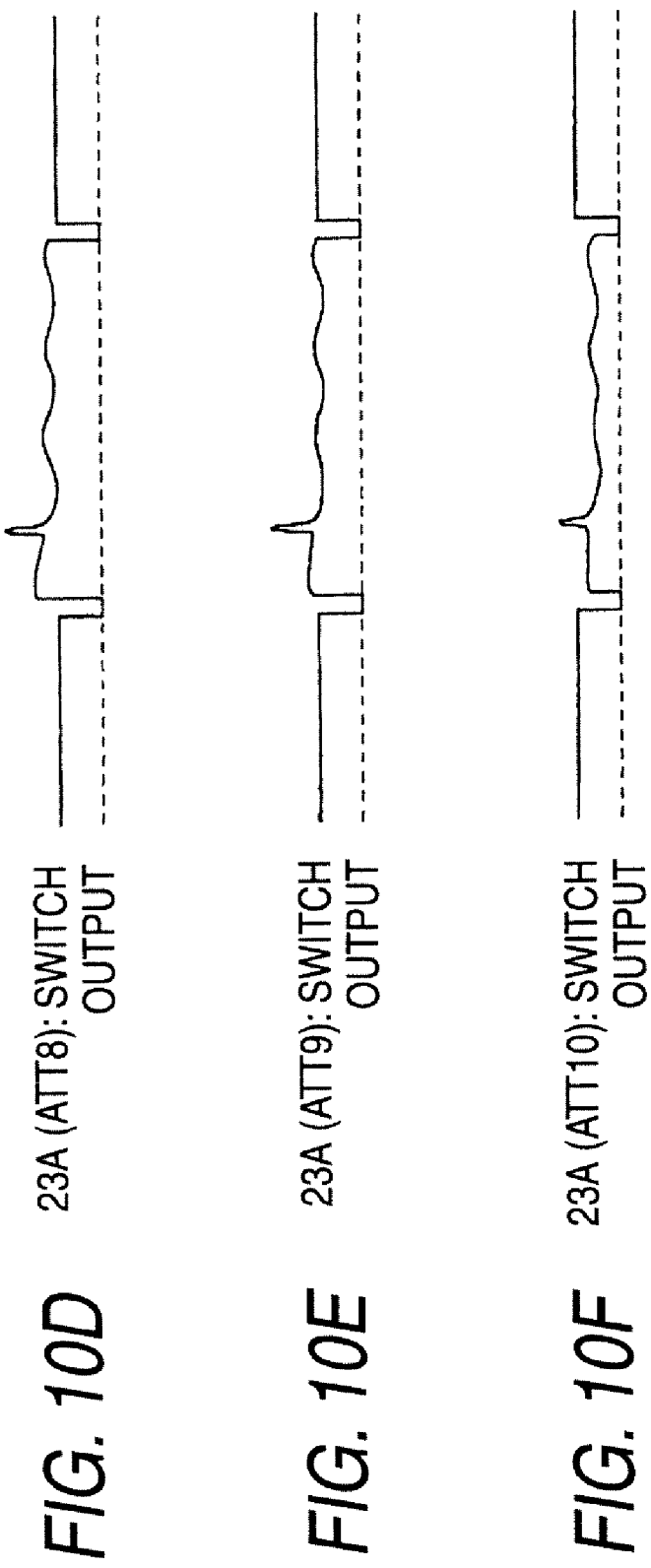

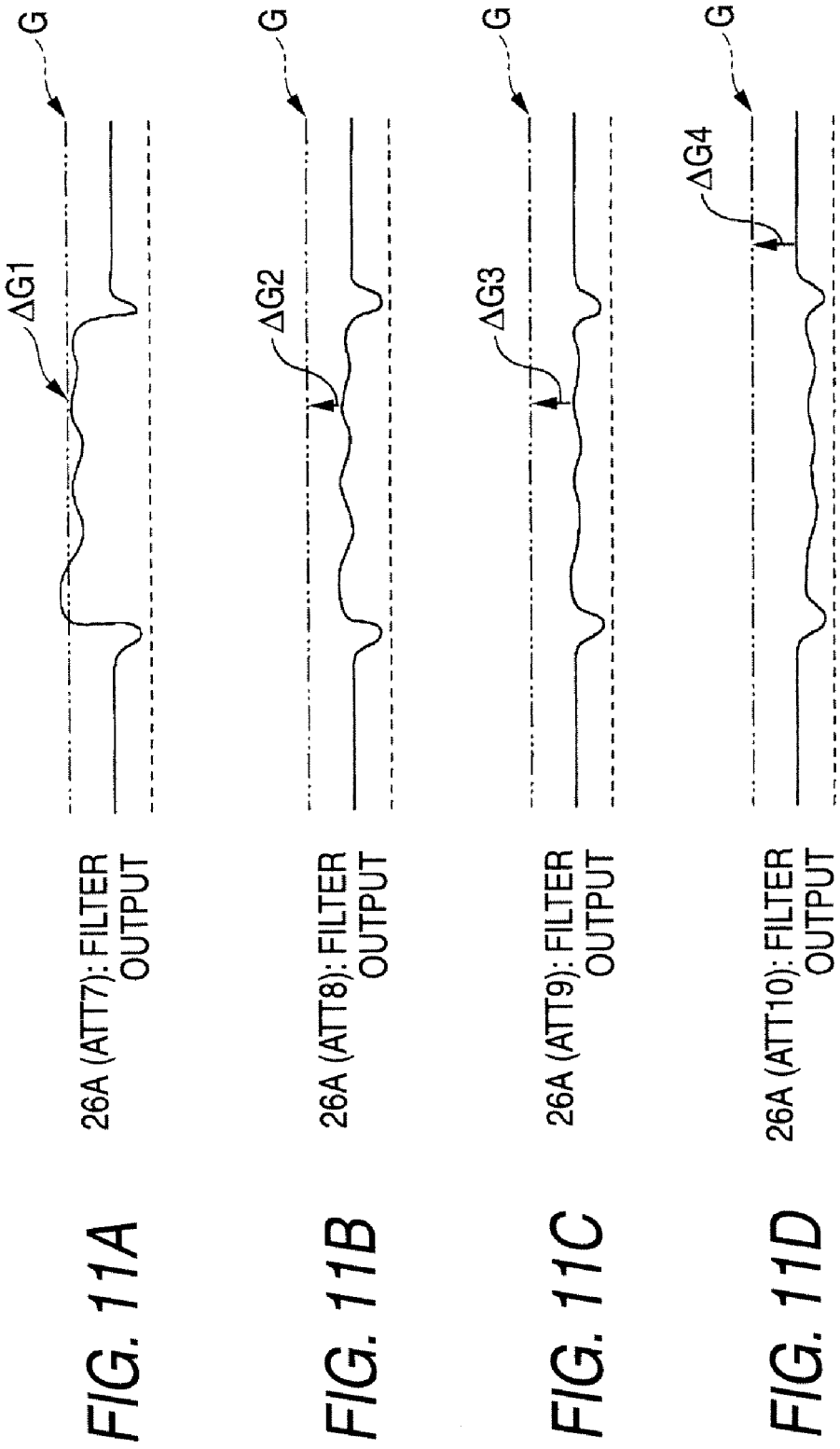

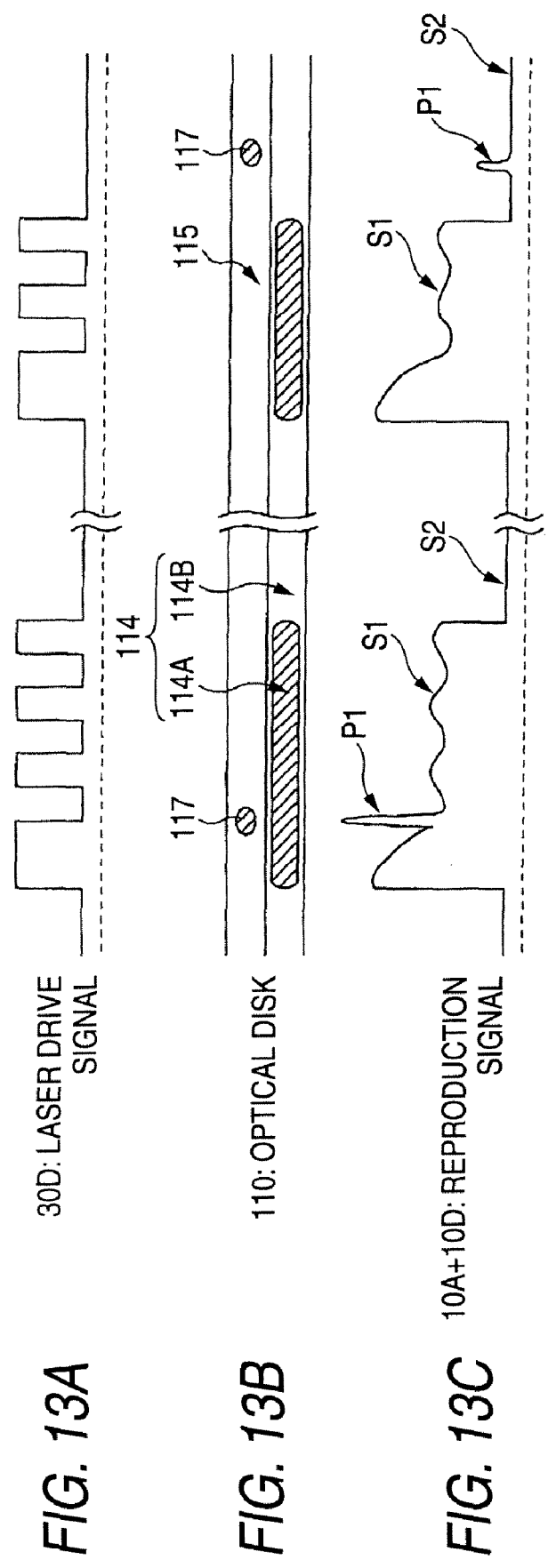

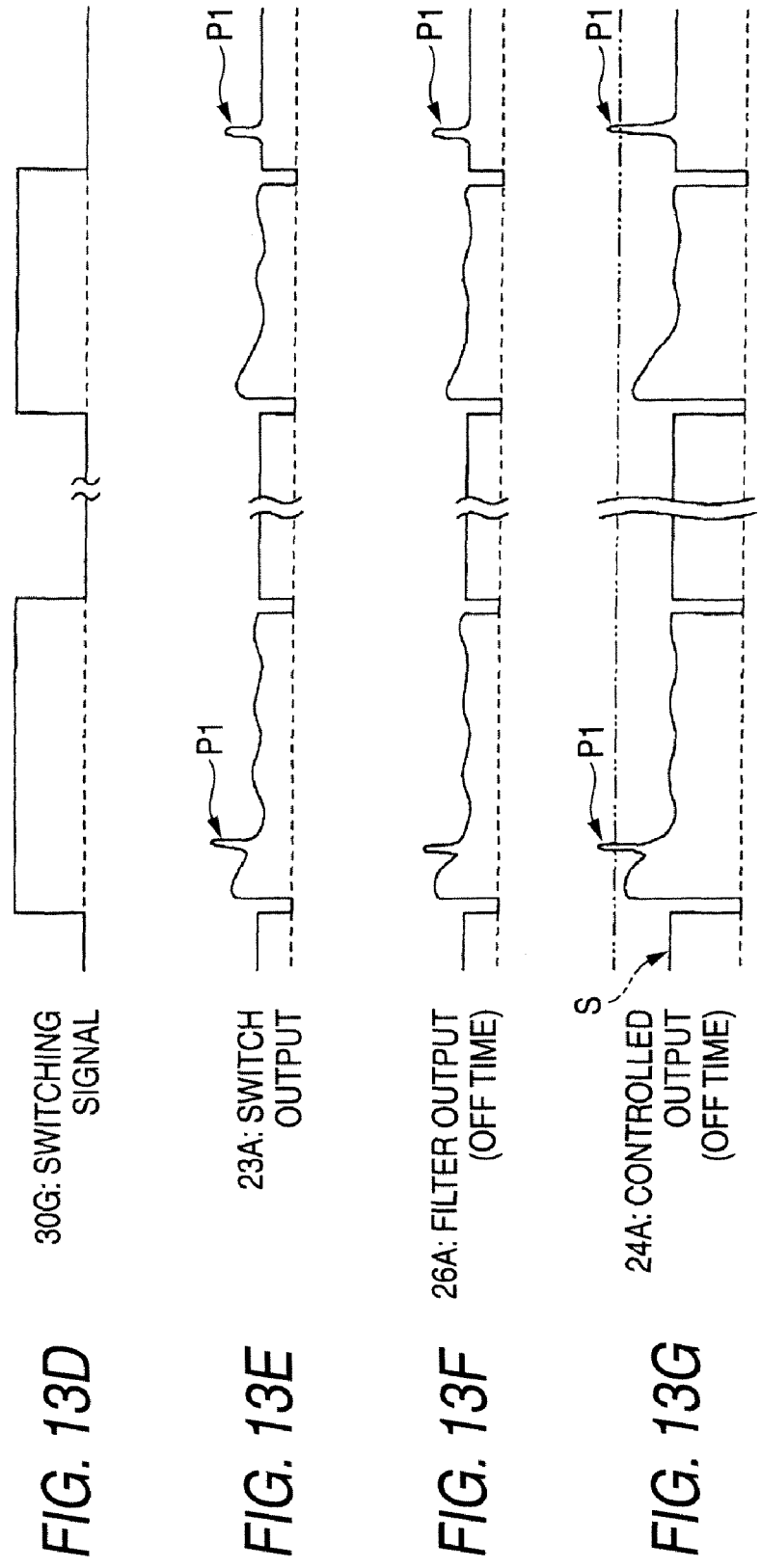

ATTENUATION-AMOUNT ADJUSTING CIRCUIT, OPTICAL DISK DRIVE DEVICE, ATTENUATION-AMOUNT ADJUSTING METHOD, AND ADDRESS-INFORMATION ACQUIRING METHOD

CROSS-REFERENCES TO RELATED APPLICATIONS

The present invention contains subject matter related to Japanese Patent Application JP 2006-036601 filed in the Japanese Patent Office on Feb. 14, 2006, the entire contents of which being incorporated herein by reference.

BACKGROUND OF THE INVENTION

1. Field of the Invention

The present invention relates to an attenuation-amount adjusting circuit and an attenuation-amount adjusting method for adjusting an attenuation amount of a reproduction signal corresponding to reflected light (return light) from an optical disk. The present invention also relates to an optical disk drive device and an address-information acquiring method for detecting physical address information on the optical disk.

2. Description of the Related Art

In general, in a recordable optical disk, in irradiating a laser beam on a groove to write data in the optical disk, it is necessary to accurately detect linear velocity in each radial position and a physical position in the groove. The linear velocity is used for, for example, rotation control for the optical disk and generation of a master clock for recording. The physical position in the groove is used for, for example, determination of an accurate recording position in bit units and acquisition of physical address information on the optical disk.

In general, the groove is formed by a spiral groove and spiral lands. The groove and the lands have a pattern that meanders at a fixed period with respect to a circumferential direction (a tracking direction) of the optical disk. A marker such as a wobble pattern having a period shorter than the period of the wobble pattern described above, a pre-pit of a hollow shape, or a land pre-pit of a split shape that traverses the groove is formed in the groove according to a type of a pre-format of a medium.

An optical disk drive device that copes with the optical disk having such a structure irradiates a laser beam on the groove of the rotating optical disk and detects, from reflected light from the optical disk, data recorded in the groove, information (linear velocity) corresponding to the wobble pattern of the long period, information corresponding to the marker (physical address information in the groove), and the like.

In writing data in the optical disk, the optical disk drive device alternately irradiates, on the basis of recorded data, a laser beam having extremely high power compared with that in the case of readout (a laser beam of a writing level) and a laser beam having low power equivalent to that in the case of readout (a laser beam of a readout level). Consequently, a pit having a relatively low reflectance is formed in the groove and data is written in the optical disk only when the laser beam of the writing level is irradiated.

In this case, a light intensity of the reflected light from the optical disk is larger as a light intensity of the irradiated light is larger and as a reflectance on an irradiation surface is larger. However, a difference between light intensities of the laser beams of the writing level and the readout level is overwhelmingly large compared with a difference between reflectances in the groove. Thus, a magnitude of a light intensity of a laser beam is predominant over a magnitude of a light intensity of the reflected light from the optical disk. Therefore, a light intensity of reflected light (reflected light of the laser beam of the writing level) in a period in which a pit is formed by irradiation of the laser beam of the writing level is extremely larger than a light intensity of reflected light (reflected light of the laser beam of the readout level) in a period in which a pit is not formed by irradiation of the laser beam of the readout level. Thus, it is likely that a reproduction signal corresponding to the reflected light of the laser beam of the writing level is saturated. In particular, in recent years, a light intensity of the laser beam of the writing level increases because of an increase in speed and an increase in capacity of an optical disk. Thus, it is extremely highly likely that a reproduction signal corresponding to the reflected light of the laser beam of the writing level is saturated.

Therefore, it is conceivable to, for example, expand an upper limit of a dynamic range of a pickup, an integrated circuit for processing an output signal of the pickup, and the like. However, to expand the upper limit of the dynamic range of the pickup, the integrated circuit, and the like, it is necessary to increase a voltage of a power supply that supplies power to the pickup, the integrated circuit, and the like. As a result, power consumption increases.

It is also conceivable to, for example, uniformly attenuate amplitude levels of reproduction signals corresponding to the reflected light of the laser beam of the writing level and the reflected light of the laser beam of the readout level. However, in that case, an amplitude level of a reproduction signal corresponding to, when the laser beam of the writing level is irradiated on the marker, light corresponding to the marker (reflected light of the marker at the time of writing) included in the reflected light is not equal to an amplitude level of a reproduction signal corresponding to, when the laser beam of the readout level is irradiated on the marker, light corresponding to the marker (reflected light of the marker at the time of readout) included in the reflected light. Therefore, compared with a predetermined slice level, it is difficult to binarize these reproduction signals. As a result, it is extremely difficult to detect the physical address information in the groove.

Thus, in the past, for example, as described in JP-A-2002-334446, attenuation processing by an attenuator is applied to only the reproduction signal corresponding to the reflected light of the laser beam of the writing level.

SUMMARY OF THE INVENTION

In the explanation in JP-A-2002-334446, it is possible to attenuate the amplitude level of the reproduction signal corresponding to the reflected light of the laser beam of the writing level to stably and accurately detect physical address information in the groove. However, it is not clearly mentioned to which level the amplitude level should be attenuated and, if there is an optimum level, how the optimum level can be found. Actually, under the present situation, those who are doing actual work have no qualitative measure for finding an optimum level and grope for an optimum level. Thus, in the past, since it is not easy to find an optimum level, it is difficult to stably and accurately detect physical address information in the groove.

Therefore, it is desirable to provide an attenuation-amount adjusting circuit, an optical disk drive device, an attenuation-amount adjusting method, and an address-information acquiring method with which it is possible to easily select an optimum attenuation amount of an amplitude level of a reproduction signal corresponding to reflected light of a laser beam of a writing level and, as a result, stably and accurately detect physical address information in a groove.

According to an embodiment of the invention, there is provided an attenuation-amount adjusting circuit used for an optical disk drive device that copes with an optical disk including a groove formed by a wobble pattern and plural markers indicating physical positions in the groove. The attenuation-amount adjusting circuit includes a pickup including a light irradiating unit that alternately irradiates a laser beam of a writing level and a laser beam of a readout level on the optical disk and a light receiving unit that receives reflected light of the laser beam irradiated on the optical disk and converts the reflected light into a reproduction signal. The attenuation-amount adjusting circuit further includes a writing-waveform attenuating unit that attenuates an amplitude level of a writing waveform corresponding to the reflected light of the laser beam of the writing level in the reproduction signal outputted from the light receiving unit of the pickup according to a position from a rising edge of the writing waveform.

According to another embodiment of the invention, there is provided an optical disk drive device including the attenuation-amount adjusting circuit and an address-information detecting circuit. The address-information detecting circuit includes an address-information acquiring unit that extracts signal components corresponding to the markers from the reproduction signal attenuated by the writing-waveform attenuating unit and acquires physical address information in the groove.

In the attenuation-amount adjusting circuit and the optical disk drive device according to the embodiments, the writing-waveform attenuating unit attenuates the amplitude level of the writing waveform corresponding to the reflected light of the laser beam of the writing level in the reproduction signal outputted from the light-receiving unit according to a position from a rising edge of the writing waveform.

According to still another embodiment of the invention, there is provided an attenuation-amount adjusting method including steps (A) to (D) below.

(A) A step of driving to rotate an optical disk having a groove formed by a wobble pattern and plural markers indicating physical positions in the groove (B) A step of alternately irradiating a laser beam of a writing level and a laser beam of a readout level on the rotating optical disk (C) A step of receiving reflected light of the laser beam irradiated on the optical disk and converting the reflected light into a reproduction signal (D) A step of attenuating an amplitude level of a writing waveform corresponding to the reflected light of the laser beam of the writing level in the reproduction signal according to a position from a rising edge of the writing waveform.

According to still another embodiment of the invention, there is provided an address-information acquiring method including the steps (A) to (D) of the attenuation-amount adjusting method and including, subsequent to the steps, a step of extracting signal components corresponding to the markers from the reproduction signal attenuated and acquiring physical address information in the groove.

In the attenuation-amount adjusting method and the address-information acquiring method according to the embodiments, an amplitude level of the writing waveform corresponding to the reflected light of the laser beam of the writing level in the reproduction signal is attenuated according to a position from the rising edge of the writing waveform.

In the attenuation-amount adjusting circuit and the optical disk drive device according to the embodiments, the writing-waveform attenuating unit attenuates an amplitude level of the writing waveform corresponding to the reflected light of the laser beam of the writing level in the reproduction signal outputted from the light receiving unit according to a position from the rising edge of the writing waveform. Thus, even if an amplitude level of the writing waveform substantially varies at the time of rising of the writing waveform, at the time of falling of the writing waveform, and the like, it is possible to attenuate all the writing waveforms to an optimum level. It is possible to easily select the optimum attenuation-amount of the amplitude level of the writing waveform in this way. As a result, it is possible to stably and accurately detect physical address information in a groove.

In the attenuation-amount adjusting method and the address-information acquiring method according to the embodiments, an amplitude level of the writing waveform corresponding to the reflected light of the laser beam of the writing level in the reproduction signal is attenuated according to a position from the rising edge of the writing waveform. Thus, even if an amplitude level of the writing waveform substantially varies at the time of rising of the writing waveform, at the time of falling of the writing waveform, and the like, it is possible to attenuate all the writing waveforms to an optimum level. It is possible to easily select the optimum attenuation-amount of the amplitude level of the writing waveform in this way. As a result, it is possible to stably and accurately detect physical address information in a groove.

BRIEF DESCRIPTION OF THE DRAWINGS

FIG. 4 is a diagram of another example of the internal structure of the attenuator;

FIGS. 7A to 7H are waveform charts for explaining operations of the optical disk drive device;

FIGS. 10A to 10F are waveform charts for explaining functions of the attenuator;

FIGS. 11A to 11D are waveform charts for explaining functions of a low-pass filter;

FIGS. 13A to 13G are waveform charts for explaining operations of the optical disk drive device;

DESCRIPTION OF THE PREFERRED EMBODIMENTS

Embodiments of the invention will be hereinafter explained in detail with reference to the accompanying drawings.

First Embodiment

Figure 1:
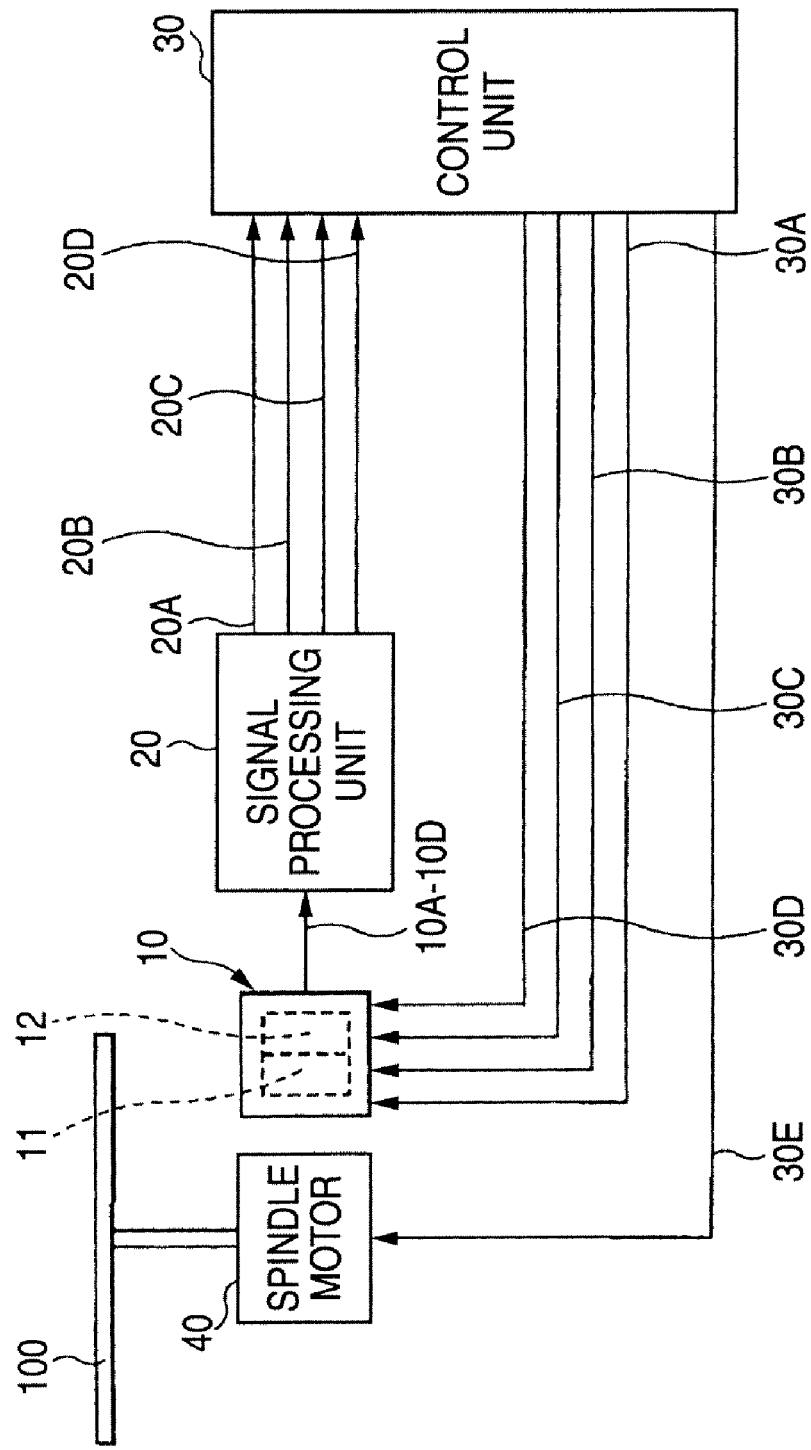
FIG. 1 is a functional block diagram of an optical disk drive device according to a first embodiment of the invention.
Figure 2:
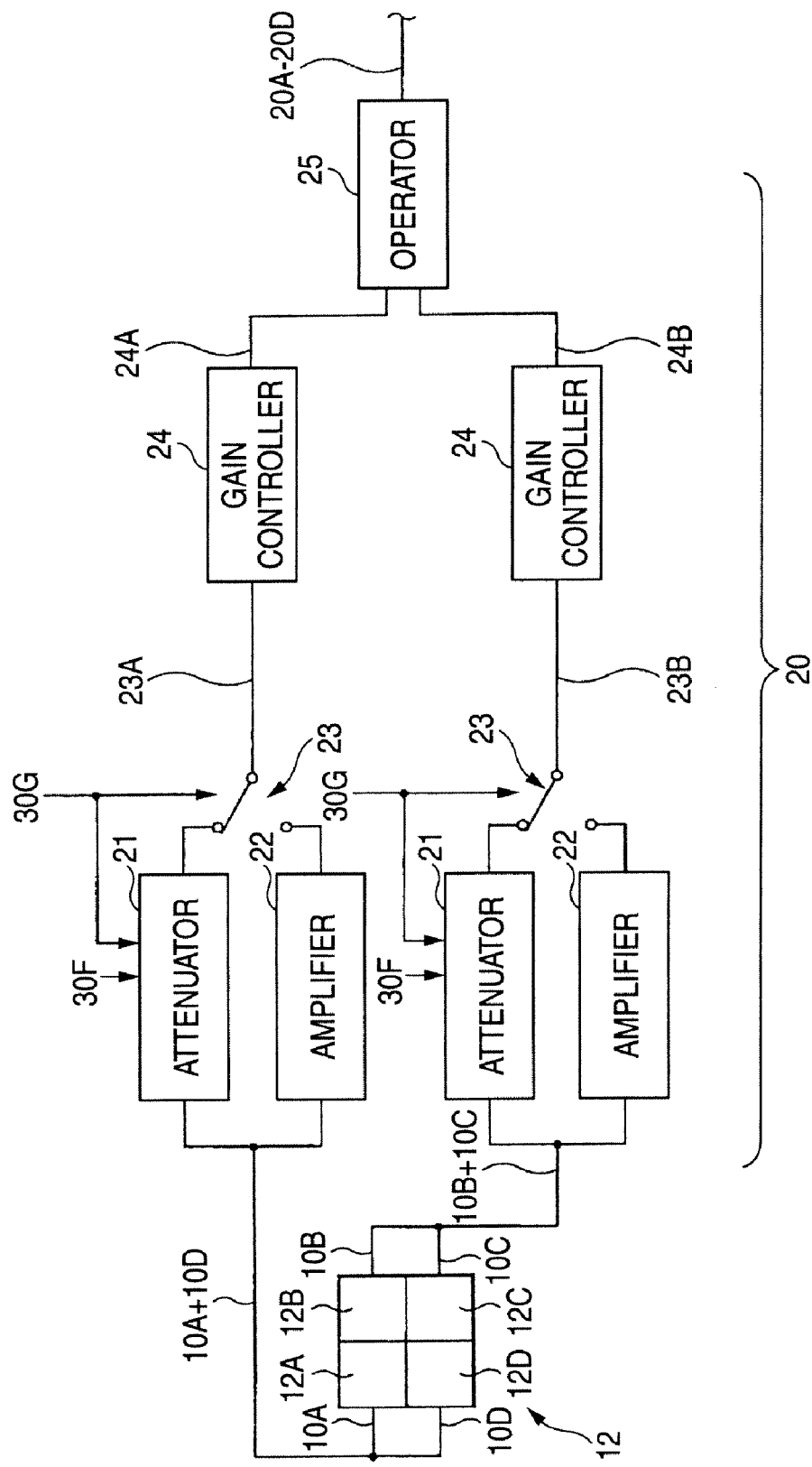
FIG. 2 is a diagram of internal structures of a photodetector and a signal processing unit in FIG. 1.

FIG. 1 is a diagram showing each of functional blocks of an optical disk drive device according to a first embodiment of the invention. FIG. 2 is a diagram showing internal structures of a photodetector 12 and a signal processing unit 20 described later. This optical disk drive device is a device that is capable of writing recording data in a rewritable optical disk 100 (e.g., DVD±R) of a recording system using organic dye and reading out recording data recorded in the optical disk 100 while detecting a physical address (an absolute address) indicating a physical position on the optical disk 100.

Figure 3:
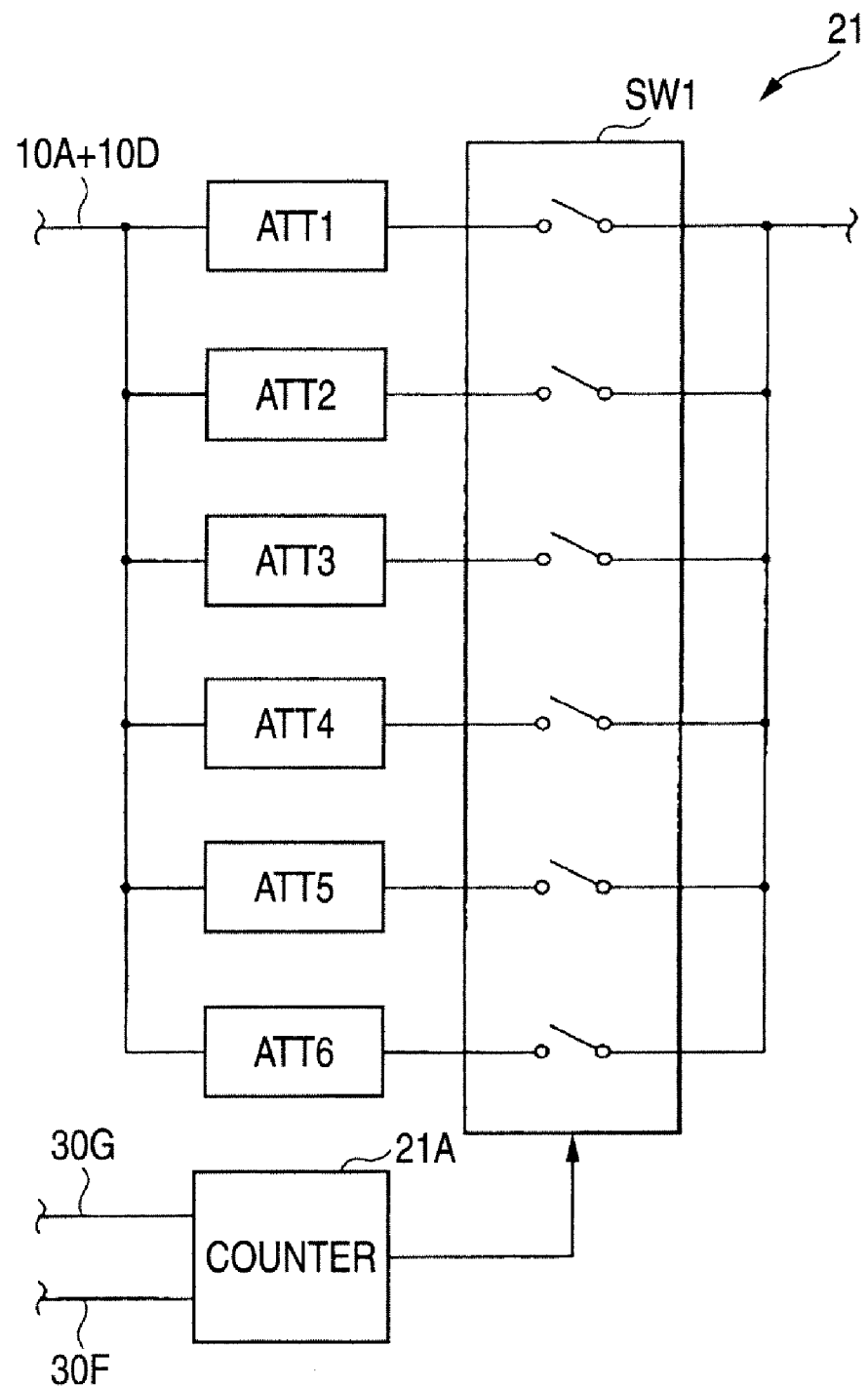
FIG. 3 is a diagram of an example of an internal structure of an attenuator.
Figure 5A:
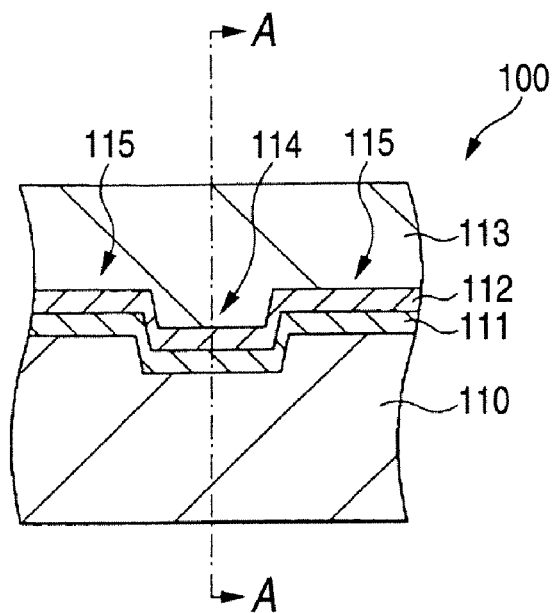
FIG. 5A is a sectional view in a tracking direction of an optical disk.
Figure 5B:
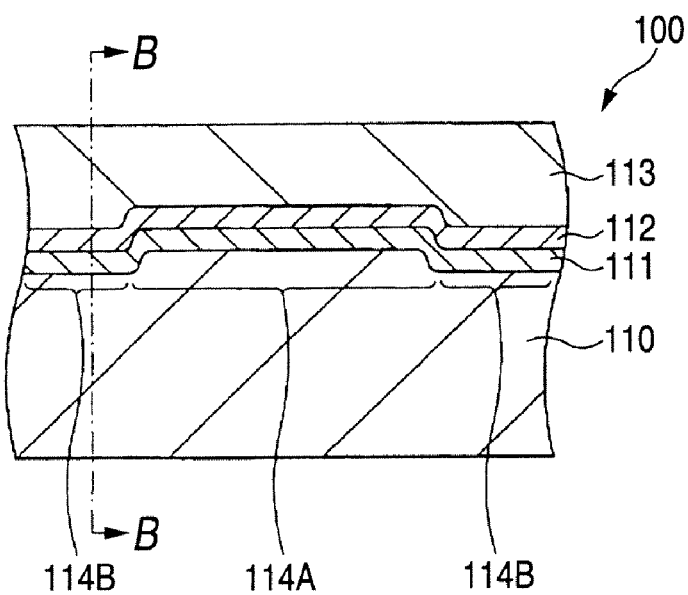
FIG. 5B is a sectional view in a radial direction of the optical disk.
Figure 6A:
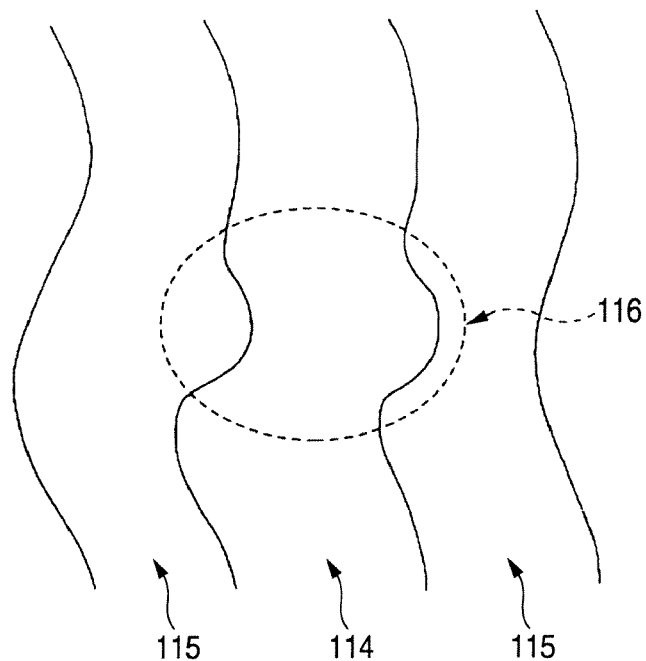
FIGS. 6A and 6B are diagrams of a plane structure of the optical disk.
Figure 6B:
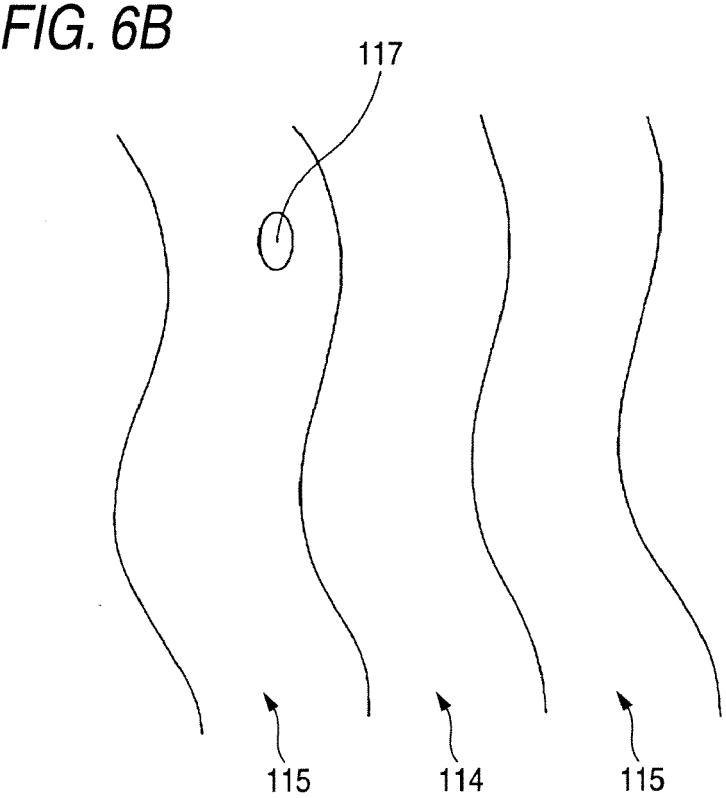

FIGS. 3 and 4 are diagrams showing examples of an internal structure of an attenuator 21 described later. FIG. 5A is a diagram showing a sectional structure in a radial direction of a portion of the optical disk 100 in which the recording data is not written (a sectional structure in an arrow B-B direction in FIG. 5B) FIG. 5B is a diagram showing a sectional structure in a circumferential direction (a tracking direction) of a portion of the optical disk 100 in which the recording data is written (a sectional structure in an arrow A-A direction in FIG. 5A). FIGS. 6A and 6B are diagrams showing examples of a plane structure of the optical disk 100.

As shown in FIG. 5A, the optical disk 100 includes, for example, a substrate 110, a recording layer 111 formed by an organic coloring matter, a reflective layer 112, and a protective layer 113 in order from a data surface (a surface on a side on which a laser beam is irradiated). A guide groove for guiding a laser beam, a so-called groove 114, is formed in a spiral shape in the substrate 110. Lands 115 are formed along both sides of the groove 114. The groove 114 and the lands 115 have a pattern wobbling at a fixed period with respect to a tracking direction of the optical disk 100. This wobble pattern is used for, for example, detection of velocity (linear velocity) of scanning of the data surface by the laser beam. The linear velocity detected is used for, for example, rotation control for the optical disk and generation of a master clock for recording.

For example, in FIG. 6A, a wobble pattern (an FM modulation section 116) having a period shorter than the wobbling period of the wobble pattern described above is formed in the optical disk 100. In FIG. 6B, a small hollow (a land pre-pit 117) is formed in the land 115. The FM modulation section 116 and the land pre-pit 117 are forms of a marker for obtaining a physical address on the optical disk 100. When the marker is scanned by a beam spot of a laser beam together with the groove 14, a sharp pulse-like component corresponding to the marker is included in reflected light (return light) obtained by the scanning. Thus, it is possible to obtain a physical address of the groove 114 by extracting this pulse-like component.

In the optical disk 100 before writing, the groove 114 has a uniform bottom surface in the tracking direction. However, in the optical disk 100 after writing, as shown in FIG. 5B, a concave section 114A and a convex section 114B are formed in the bottom surface of the groove 114. A difference of elevation of the reflective layer 112 between the convex section 114B and the concave section 114A is, for example, ¼ of a wavelength of the laser beam. The convex section 114B is arranged, in a relation with a pickup 10 described later, in a position where the convex section 114B is capable of reflecting light made incident thereon while hardly attenuating the light. Consequently, the concave section 114A attenuates the light reflected thereon according to an effect of interference with the light reflected on the convex section 114B adjacent to the concave section 114A.

The optical disk drive device includes the pickup 10, a signal processing unit 20, a control unit 30, and a spindle motor 40.

The pickup 10 is a device for irradiating a laser beam on the optical disk 100 and receiving reflected light of the laser beam irradiated to convert the reflected light into a reproduction signal (described later). The pickup 10 has, for example, a laser 11 (a light irradiating unit), the photodetector 12 (a light receiving unit), an object lens (not shown), and an optical system (not shown).

The laser 11 is, for example, a red semiconductor laser having a size of 605 nm or a blue-violet semiconductor laser having a size of 405 nm. The laser 11 irradiates a laser beam on the optical disk 100 according to a laser drive signal 30D corresponding to recording data. When the recording data is written in the optical disk 100, the laser 11 alternately irradiates a laser beam having an intensity (a writing level) several times as high as an intensity at the time of readout (a readout level) and a laser beam of the readout level on the groove 114 from the substrate 110 side on the basis of the laser drive signal 30D. Consequently, the laser 11 irradiates the laser beam of the writing level on the groove 114, causes the organic coloring matter included in the recording layer 111 to absorb the laser beam, causing local heat generation, and deforms the substrate 110 with the heat generation. As a result, the laser beam 11 forms the concave section 114A and the convex section 114B in the groove 114 to write the recording data in the optical disk 100.

The photodetector 12 has light receiving elements 12A to 12D formed by the same material as the laser 11. The photodetector 12 receives reflected light of the laser beam irradiated on the optical disk 100 in the light receiving elements 12A to 12D while dividing the reflected light into four. The photodetector 12 converts the light received in the respective light receiving elements 12A to 12D into photoelectric currents and generates, from these photoelectric currents, voltages (reproduction signals 10A to 10D) corresponding to magnitudes of the photoelectric currents.

The object lens is provided at an output terminal for a laser beam in the pickup 10 and held to be movable in the tracking direction and a focus direction (a direction perpendicular to the data surface of the optical disk 100) by, for example, a two-axis mechanism (not shown). This two-axis mechanism is driven according to a focus drive signal 30A and a tracking drive signal 30B. The optical system irradiates the laser beam on the data surface of the optical disk 100 via the object lens and guides the reflected light to the photodetector 12. The entire pickup 10 is held to be movable in the radial direction of the optical disk 100 by, for example a thread mechanism (not shown). This thread mechanism is driven according to a thread drive signal 30C.

The reproduction signals 10A to 10D described above have a signal waveform corresponding to a light intensity of the reflected light. The light intensity of the reflected light is a function of a light intensity of the laser beam irradiated from the laser 11 and a reflectance of an irradiation surface (the data surface) of the optical disk 100. The light intensity of the laser beam corresponds to a pulse waveform of the laser drive signal 30D. The reflectance of the irradiation surface corresponds to reflectances of the concave section 114A and the convex section 114B in the groove 114. However, a difference between light intensities of the laser beams of the writing level and the readout level is overwhelmingly large compared with a difference between the reflectances of the irradiation surface. Thus, a magnitude of a light intensity of the laser beam is predominant over a magnitude of the reproduction signals 10A to 10D. Therefore, as shown in FIG. 7A to 7C, in a reproduction signal (10A+10D), an amplitude level of signal waveforms (writing waveforms S1) corresponding to reflected light (reflected light of the laser beam of the writing level) in a period in which the concave section 114A is formed by irradiation of the laser beam of the writing level based on the laser drive signal 30D is extremely larger than an amplitude level of signal waveforms (readout waveforms S2) corresponding to reflected light (reflected light of the laser beam of the readout level) in a period in which the concave section 114A is not formed by irradiation of the laser beam of the readout level based on the laser drive signal 30D. At an initial stage when the laser beam of the writing level is started to be irradiated on the optical disk 110, heat is not immediately generated from the recording layer 111 and the concave section 114A is not immediately formed in the groove 114. Thus, although a reflectance of the optical disk 100 unstably changes, the reflectance is generally high like that of the convex section 114B. According to formation of the concave section 114A in the groove 114, the reflectance of the optical disk 100 tends to gradually fall. Therefore, as shown in FIG. 7C, the writing waveforms S1 of the reproduction signals (10A+10D) and (10B+10C) are waveforms in which an amplitude level is larger at first and gradually falls.

As shown in FIG. 7C, sharp pulse-like waveforms P1 generated in association with land pre-pits 117 are waveforms for obtaining a physical address of the groove 114. The waveforms P1 may be included in the writing waveforms S1 or may be included in the readout waveforms S2. When the waveforms P1 are included in the writing waveforms S1, the waveforms P1 are generated by irradiation of the laser beam of the writing level on the land pre-pits 117. Thus, an amplitude of the waveforms P1 in that case is extremely high. On the other hand, when the waveforms P1 are included in the readout waveforms S2, the waveforms P1 are generated by irradiation of the laser beam of the readout level on the land pre-pits 117. Thus, an amplitude of the waveforms P1 in that case is extremely low compared with that of the waveforms P1 included in the writing waveforms S1. In this way, there is a large fluctuation in the amplitude of the waveforms P1 included in the reproduction signal (10A+10D). Therefore, as described later, when the reproduction signal (10B+10C) is subtracted from the reproduction signal (10A+10D) to obtain a push-pull signal 20D, it is difficult to extract the waveforms P1 simply by binarizing the push-pull signal 20D at a predetermined amplitude level. Thus, to make it possible to extract the waveforms P1 by binarizing the push-pull signal 20D at the predetermined amplitude level, it is necessary to appropriately adjust waveforms of the reproduction signals (10A+10D) and (10B+10C).

The signal processing unit 11 is a unit for appropriately adjusting waveforms of the reproduction signals (10A+10D) and (10B+10C) to make it possible to extract the waveforms P1 by binarizing the push-pull signal 20D at the predetermined amplitude level. The signal processing unit 11 has two modules including attenuators 21, amplifiers 22, switches 23, and gain controllers 24 in parallel. The photodetector 12 and an operator 25 are connected to a pre-stage and a post-stage of these two modules, respectively.

In each of the modules, input terminals of the attenuator 21 and the amplifier 22 are connected to each other and output terminals thereof are separately connected to two input terminals of the switch 23. An output terminal of the switch 23 is connected to an input terminal of the gain controller 24. Output terminals of the gain controllers 24 of the respective modules are separately connected to two input terminals of the operator 25. The input terminals of the attenuator 21 and the amplifier 22 in one module are connected to the light receiving elements 12A and 12D of the photodetector 12. The input terminals of the attenuator 21 and the amplifier 22 in the other module are connected to the light receiving elements 12B and 12C of the photodetector 12.

The switch 23 is, for example, a semiconductor switch. The switch 23 selects an output of one of the attenuator 21 and the amplifier 22 in a time division manner on the basis of a switching signal 30G and inputs the output to the gain controller 24. Specifically, the switch 23 inputs an output from the attenuator 21 side to the gain controller 24 in periods in which the writing waveforms S1 are inputted to the attenuator 21 and short periods before and after the periods. In other periods, i.e., periods in which waveforms of portions excluding waveforms near the writing waveforms S1 in the readout waveforms S2 are inputted to the amplifier 22, the switch 23 inputs an output from the amplifier 22 side to the gain controller 24. In other words, the switch 23 inputs a switch output 23A obtained by temporally alternately coupling a signal waveform attenuated by the attenuator 21 and a signal waveform amplified by the amplifier 22 to the gain attenuator 24. If possible, the switch 23 may input the output from the attenuator 21 side to the gain controller 24 only in the periods in which the writing waveforms S1 are inputted to the attenuator 21 and input the output from the amplifier 22 side to the gain controller 24 only in periods in which the readout waveforms S2 are inputted to the amplifier 22.

The attenuator 21 has, for example, as shown in FIG. 3, attenuators ATT1 to ATT6, a switch SW1, and a counter 21A. The attenuators ATT1 to ATT6 are, for example, attenuators that have smaller attenuation levels as numbers at the end thereof are larger. The attenuators ATT1 to ATT6 are arranged in parallel to one another. Input terminals of the attenuators ATT1 to ATT6 are commonly connected to one another and output terminals thereof are separately connected to the switch SW1 in parallel to one another. The switch SW1 has switches in the same number as the attenuators ATT1 to ATT6. Input terminals of the switches in the switch SW1 are separately connected to the attenuators ATT1 to ATT6 in parallel to one another. Output terminals of the switches in the switch SW1 are commonly connected to one another. The switch SW1 turns on one of the switches built therein according to, for example, a count value from the counter 21A. The counter 21A counts a clock number of a channel clock 30F from the time when a switching signal 30G used for switching the switch SW1 changes from "L" to "H" and inputs a count value to the switch SW1. The counter 21A sets the count value back to 0 when the switching signal 30G changes from "H" to "L".

Consequently, the attenuator 21 switches the attenuators ATT1 to ATT6 according to, for example, the number of channel clocks and attenuates the writing waveforms S1 with an attenuation amount corresponding to a magnitude of an amplitude level of the writing waveforms S1 of the reproduction signals (10A+10D) and (10B+10C) (see FIGS. 7C, 7F, and 7G). In other words, even when shapes of the writing waveforms S1 change according to, for example, time widths of the writing waveforms S1, the attenuator 21 is capable of attenuating the writing waveforms S1 with an appropriate attenuation amount. The attenuator 21 can arbitrarily set switching frequencies of the attenuators ATT1 to ATT6 by appropriately changing a frequency of the channel clock 30F, a count value in switching the attenuators ATT1 to ATT6, and the like. Thus, it is possible to carefully control an attenuation amount.

Other than the structure shown in FIG. 3, the attenuator 21 may have, for example, as shown in FIG. 4, the attenuators ATT1 to ATT6, a switch SW2, and the counter 21A. The attenuators ATT1 to ATT6 are, for example, attenuators that have larger attenuation levels as numbers at the end thereof are larger. The attenuators ATT1 to ATT6 are connected in series in this order. An input terminal of the attenuator ATT1 is connected to an output terminal of the photodetector 12. Output terminals of the attenuators ATT1 to ATT6 are connected to the attenuators at post-stages thereof, respectively, and separately connected to an input terminal of the switch SW2. The switch SW2 has one switch including input terminals in the same number as the attenuators ATT1 to ATT6 and one output terminal. Input terminal of the switches in the switch SW2 are separately connected to the attenuators ATT1 to ATT6 in parallel to one another. The switch SW2 turns on one of the input terminals of the switches built therein according to, for example, a count value from the counter 21A. In this way, the attenuator 21 can take various forms.

The amplifier 22 is, for example, an amplifier having a fixed amplification amount. The amplifier 22 amplifies the readout waveforms S2 of the reproduction signals (10A+10D) and (10B+10C) with the fixed amplification amount (see FIGS. 7C and 7G).

The gain controller 24 is, for example, an AGC (Auto Gain Controller). The gain controller 24 amplifies an amplitude level of outputs of the switch 23 (switch outputs 23A and 23B: reproduction signals after processing) to an optimum level to set the outputs at an amplitude level optimum for the operator 25 at a post-stage thereof (e.g., a gain control level G shown in FIG. 7G).

The operator 25 generates an RF signal 20A equivalent to recording data, a focus error signal 20B and a tracking error signal 20C for control of the two-axis mechanism that moves the object lens, and a push-pull signal 20D including information on a wobble pattern and a marker of the groove 114 from an output (a controlled output 24A) from the gain controller 24 of one module and an output (a controlled output 24B) from the gain controller 24 of the other module.

The control unit 30 is, for example, a DSP (Digital Signal Processor). The control unit 30 applies processing suitable for various signals from the operator 25 and other routes to the signals. Specifically, the control unit 30 processes the RF signal 20A from the operator 25 to generate recording data recorded in the optical disk 100. The control unit 30 processes the focus error signal 20B and the tracking error signal 20C from the operator 25 to generate the focus drive signal 30A and the tracking drive signal 30B for controlling the two-axis mechanism in the pickup 10 and the thread drive signal 30C for controlling the thread mechanism. The control unit 30 processes the push-pull signal 20D from the operator 25 to generate linear velocity and physical address information and generate the spindle drive signal 30E for controlling the spindle motor 40 from these kinds of information. Moreover, the control unit 30 generates the laser drive signal 30D on the basis of recording data from the other routes.

The spindle motor 40 is a motor for driving to rotate the optical disk on the basis of the spindle drive signal 30E.

Operations at the time of writing by the optical disk drive device according to this embodiment will be hereinafter explained. Writing in the optical disk 100 in FIG. 6B will be explained below. However, writing in the optical disk 100 in FIG. 6A is also possible.

First, the control unit 30 generates the laser drive signal 30D and outputs the laser drive signal 30D to the laser 11 (see FIG. 7A). Then, the laser 11 is driven to emit light on the basis of the laser drive signal 30D from the control unit 30. A laser beam of the writing level several times as intense as the readout level and a laser beam of the readout level are alternately irradiated on the groove 114 from the substrate 110 side. Consequently, the laser beams are absorbed by the organic coloring matter included in the recording layer 111, causing local heat generation. The substrate 110 is deformed by the heat generation. As a result, the concave section 114A and the convex section 114B are formed in the groove 114 (see FIG. 7B). In this way, recording data is written in the optical disk 100. In this case, reflected light is absorbed by the photodetector 12 and converted into the reproduction signals (10A+10D) and (10B+10C) (see FIG. 7C).

A path of the reproduction signals (10A+10D) and (10B+10C) are switched in a time division manner according to a switching operation of the switch 23 based on the switching signal 30G (see FIGS. 7C and 7D). Specifically, a path on the attenuator 21 side is selected in periods corresponding to the writing waveforms S1 and short periods before and after the periods and a path on the amplifier 22 side is selected in periods other than the periods, that is, periods corresponding to waveforms of portions excluding waveforms of portions adjacent to the writing waveforms S1 in the readout waveforms S2.

In this case, in the attenuator 21, the attenuators ATT1 to ATT6 continuously switch to a magnitude corresponding to an amplitude level of the writing waveforms S1 on the basis of the switching signal 30G and the channel clock 30F (see FIGS. 7C to 7F). Consequently, the writing waveforms S1 and the waveforms in the portions adjacent to the writing waveforms S1 in the readout waveforms S2 are attenuated by an attenuation amount corresponding to an attenuation level of the attenuators ATT1 to ATT6 by the attenuator 21. On the other hand, the waveforms in the portions excluding the waveforms in the portions adjacent to the writing waveforms S1 in the readout waveforms S2 are amplified by a fixed amount by the amplifier 22 (see FIG. 7G).

The switch outputs 23A and 23B are amplified to the gain control level G by the gain controller 24 and the controlled outputs 24A and 24B amplified are inputted to the operator 25 (see FIG. 7H). The operator 25 generates the RF signal 20A, the focus error signal 20B, the tracking error signal 20C, and the push-pull signal 20D on the basis of the controlled outputs 24A and 24B and outputs these signals to the control unit 30.

The control unit 30 processes the RF signal 20A from the operator 25 to generate recording data recorded in the optical disk 100. The control unit 30 processes the focus error signal 20B and the tracking error signal 20C from the operator 25 to generate the focus drive signal 30A, the tracking drive signal 30B, and the thread drive signal 30C.

Moreover, the control unit 30 processes the push-pull signal 20D to generate linear velocity and physical address information and generate the spindle drive signal 30E for controlling the spindle motor 40 from these kinds of information. Specifically, the control unit 30 detects a basic frequency of the push-pull signal 20D and calculates linear velocity on the basis of the basic frequency. The control unit 30 extracts the waveforms P1 by binarizing the push-pull signal 20D at a predetermined amplitude level (e.g., a slice level S in FIG. 7H) and then calculates physical address information from the waveforms P1 on the basis of a predetermined algorithm.

Consequently, in this embodiment, when the attenuator 21 attenuates an amplitude level of the writing waveforms S1 in the reproduction signals (10A+10D) and (10B+10C) outputted from the photodetector 12, the attenuators ATT1 to ATT6 are switched according to the number of channel clocks to attenuate the writing waveforms S1 with an attenuation amount corresponding to a magnitude of the amplitude level of the writing waveforms S1 in the reproduction signals (10A+10D) and (10B+10C). Thus, even if an amplitude level of the writing waveforms S1 substantially varies at the time of rising of the writing waveforms S1, at the time of falling of the writing waveforms S1, and the like, it is possible to attenuate the writing waveforms S1 to an optimum level. In particular, since an attenuation amount is set large in unstable portions at the time of rising of the writing waveforms S1, it is possible to input a stable waveform to the gain controller 24. As a result, it is possible to improve address acquisition performance.

In this way, in this embodiment, it is possible to easily select an optimum attenuation-amount of an amplitude level of the writing waveforms S1. As a result, it is possible to stably and accurately detect physical address information in the groove 114.

In attenuating the writing waveforms S, it is possible to keep a signal level of the switch outputs 23A and 23C away from a noise level. This makes it possible to more stably and accurately detect physical address information in the groove 114.

Second Embodiment

Figure 8:
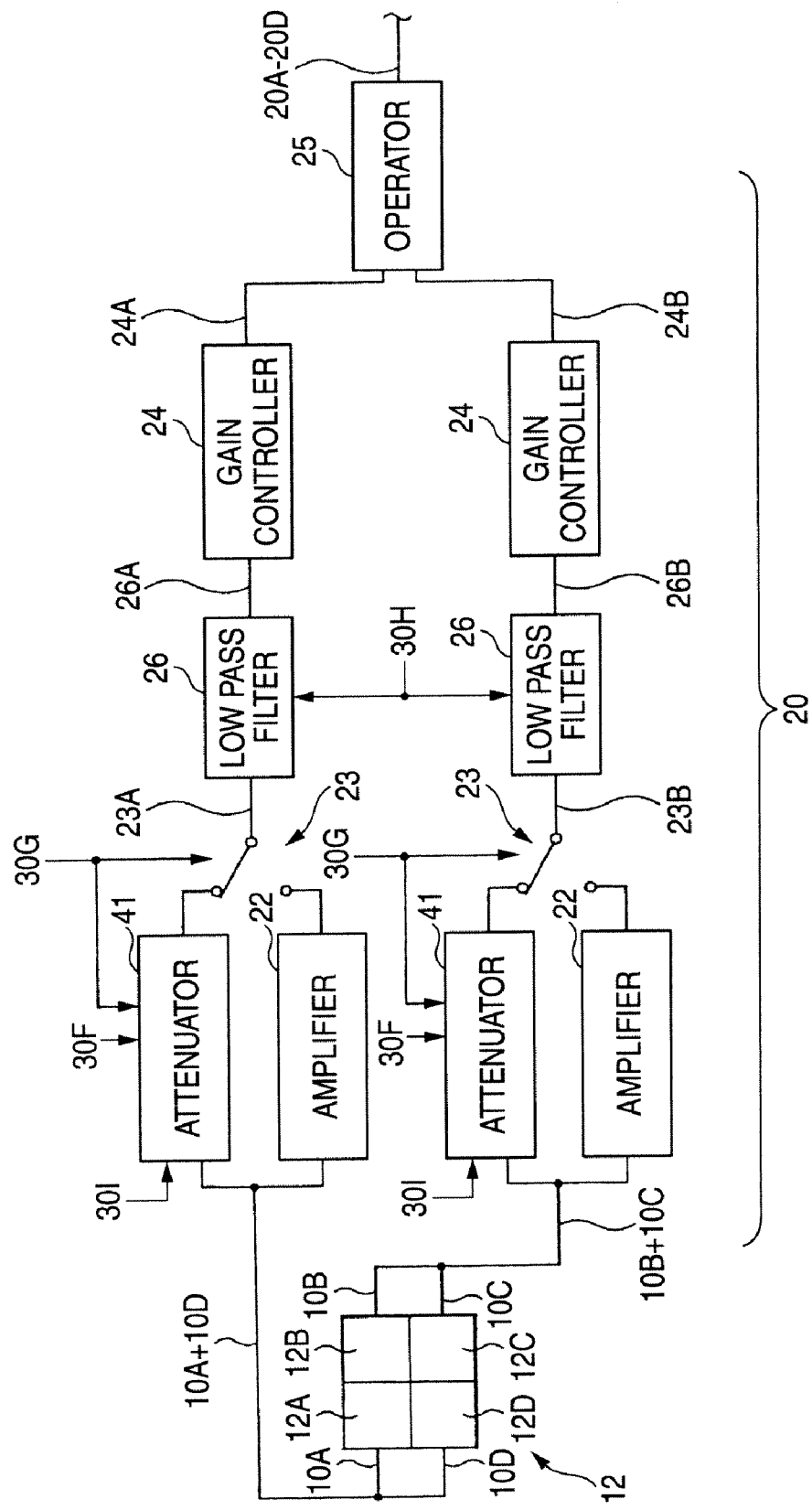
FIG. 8 is a functional block diagram of an optical disk drive device according to a second embodiment of the invention.

FIG. 8 is a diagram showing each of functional blocks of an optical disk drive device according to a second embodiment of the invention. This embodiment is mainly different from the embodiment described above in that the optical disk drive device includes an attenuator 41 and a low-pass filter 26. Thus, the difference from the embodiment described above is mainly explained and explanations of points common to both the embodiments are omitted as appropriate.

Figure 9:
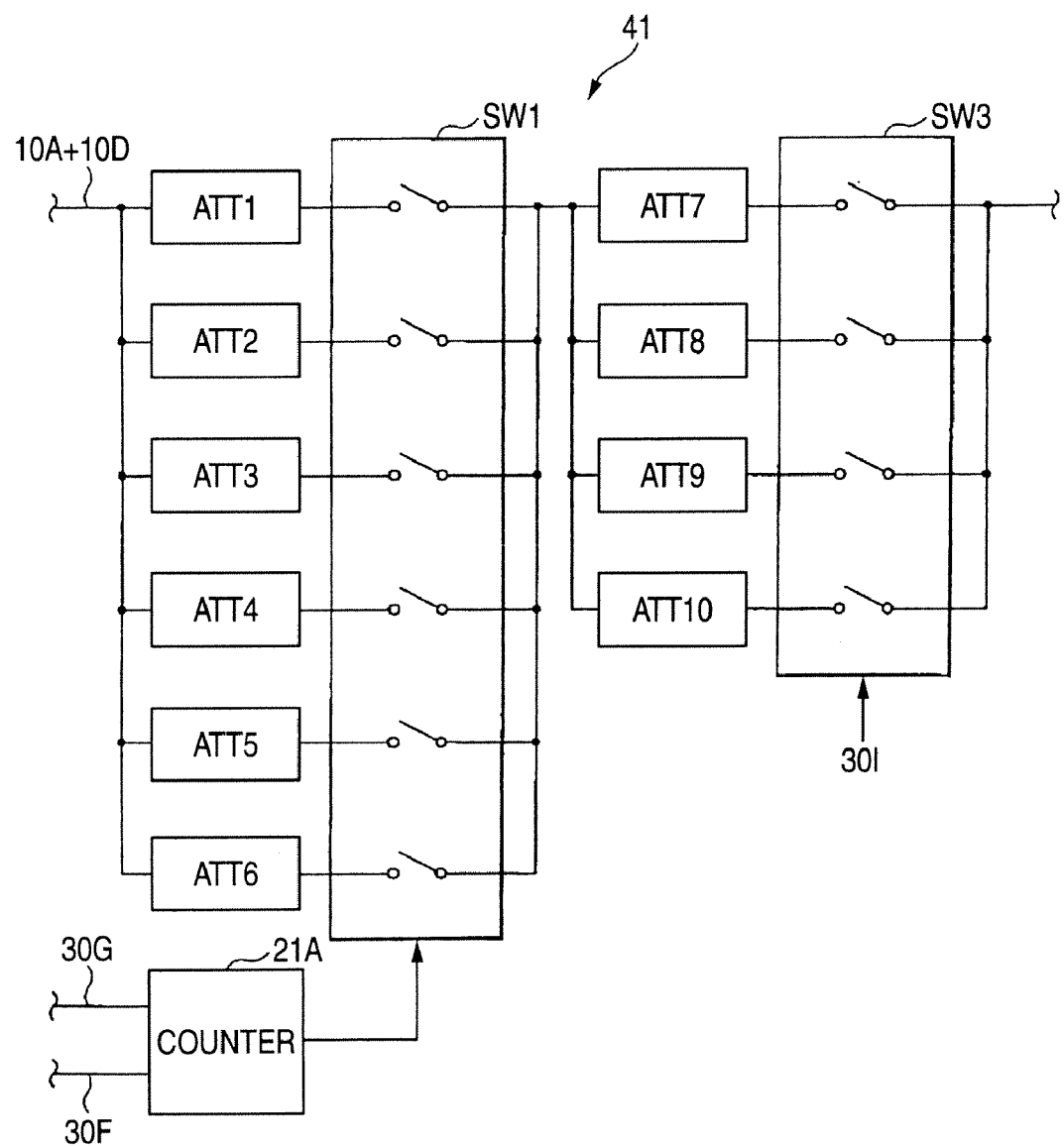
FIG. 9 is a diagram of an example of an internal structure of an attenuator in FIG. 8.

Like the attenuator 21 according to the embodiment described above, the attenuator 41 includes the attenuators ATT1 to ATT6. However, for example, as shown in FIG. 9, the attenuator 41 further includes attenuators ATT7 to ATT10 and a switch SW3.

The switch SW3 further attenuates the writing waveforms S1, which are subjected to attenuation processing using the attenuators ATT1 to ATT6 and the switch SW1, using one attenuator selected on the basis of an attenuation amount control signal 30I (see FIG. 10A and FIGS. 10C to 10F). The attenuators ATT7 to ATT10 and the switch SW3 are devices for adjusting an amplitude level of writing waveforms S1 as a whole. In this regard, the attenuators ATT7 to ATT10 and the switch SW3 are functionally different from the attenuators ATT1 to ATT6 and the switch SW1 that adjusts an amplitude level of the individual writing waveforms S1.

FIGS. 10C to 10F show waveforms of the switch output 23A at the time when the attenuators ATT7 to ATT10 having larger attenuations as numbers at the end thereof are larger are used. FIG. 10C shows a waveform of the switch output 23A at the time when the attenuator ATT7 is used. An amplitude level of the writing waveforms S1 attenuated by the attenuator 41 is considerably larger than an amplitude level of the readout waveforms S2 amplified by the amplifier 22. FIG. 10D shows a waveform of the switch output 23A at the time when the attenuator ATT8 is used. An amplitude level of the writing waveforms S1 attenuated by the attenuator 41 is slightly larger than an amplitude level of the readout waveforms S2 amplified by the amplifier 22. FIG. 10E shows a waveform of the switch output 23A at the time when the attenuator ATT9 is used. An amplitude level of the writing waveforms S1 attenuated by the attenuator 41 is substantially equal to an amplitude level of the readout waveforms S2 amplified by the amplifier 22. FIG. 10F shows a waveform of the switch output 23A at the time when the attenuator ATT10 is used. An amplitude level of the writing waveforms S1 attenuated by the attenuator 41 is slightly smaller than an amplitude level of the readout waveforms S2 amplified by the amplifier 22.

The low-pass filter 26 includes a circuit that is capable of turning on and off, on the basis of an on/off signal 30H, a function for attenuating high-frequency components included in outputs of the switch 23 (the switch outputs 23A and 23B) and transmitting low-frequency components included therein. Specifically, when the on/off signal 30H is on, the low-pass filter 26 attenuates both high-frequency components included in a signal waveform corresponding to reflected light at the time when a laser beam of the writing level is started to be irradiated on the optical disk 110 and high-frequency components included in the waveforms P1 in the switch outputs 23A and 23B (see FIGS. 11A to 11D). On the other hand, when the on/off signal 30H is off, the low-pass filter 26 transmits the switch outputs 23A and 23B without attenuating the outputs. In this way, the low-pass filter 26 attenuates the high-frequency components included in the waveforms P1 as well when the on/off signal 30H is on. Thus, it is necessary to turn on the function of the low-pass filter 26 only when an attenuation level of the attenuator 41 is adjusted and turn off the function of the low-pass filter 26 when the waveforms P1 are extracted from the push-pull signal 20D in the operator 25 as described later.

The gain controller 24 is, for example, an AGC (Auto Gain Controller) as in the embodiment described above. The gain controller 24 amplifies an amplitude level of outputs of the low-pass filter 26 (filter outputs 26A and 26B: reproduction signals after processing) to an optimum level to set the outputs at an amplitude level optimum for the operator 25 at a post-stage thereof (e.g., the gain control level G shown in FIGS. 11A to 11D). In the gain controller 24, as an amplitude level of the filter outputs 26A and 26B inputted to the gain controller 24 is more distant from the optimum amplitude level, an amplification amount $\Delta G$ is larger. Conversely, as an amplitude level of the filter outputs 26A and 26B inputted to the gain controller 24 is closer to the optimum amplitude level, the amplification amount $\Delta G$ is smaller. Therefore, for example, it is possible to amplify the filter output 26A in FIG. 11A, the filter output 26A in FIG. 11B, and the filter output 26A in FIG. 11C to the optimum level with a slight amplification amount ($\Delta G1$), an amplification amount ($\Delta G2$) slightly larger than $\Delta G1$, and an amplification amount ($\Delta G3$) slightly larger than $\Delta G2$, respectively. However, it is possible to amplify the filter output 26A in FIG. 11D to the optimum level with an amplification amount ($\Delta G4$) substantially equal to $\Delta G3$. In other words, it is seen that, when an amplitude level of the writing waveforms S1 attenuated by the attenuator 41 is substantially equal to or smaller than an amplitude level of the readout waveforms S2 amplified by the amplifier 22, the amplification amount $\Delta G$ in the gain controller 24 is saturated (see FIG. 12).

Operations at the time of writing by the optical disk drive device according to this embodiment will be hereinafter explained. Writing in the optical disk 100 in FIG. 6B will be explained. However, writing in the optical disk 100 in FIG. 6A is also possible. An explanation of the procedure of the attenuation processing using the attenuators ATT1 to ATT6 and the switch SW1, which is explained in the embodiment described above, is omitted.

First, before writing recording data in the optical disk 100, an attenuation amount at a post-stage of the attenuator 41 is set. Specifically, first, the control unit 30 generates the laser drive signal 30D for test and outputs the laser drive signal 30D for test to the laser 11 (see FIG. 13A). Then, the laser 11 is driven to emit light on the basis of the laser drive signal 30D for test from the control unit 30. A laser beam of the writing level several times as intense as the readout level and a laser beam of the readout level are alternately irradiated on the groove 114 for test from the substrate 110 side. Consequently, the laser beams are absorbed by the organic coloring matter included in the recording layer 111, causing local heat generation. The substrate 110 is deformed by the heat generation. As a result, the concave section 114A and the convex section 114B are formed in the groove 114 (see FIG. 13B). In this way, recording data for test is written in the optical disk 100.

In this case, reflected light is absorbed by the photodetector 12 and converted into the reproduction signals (10A+10D) and (10B+10C) (see FIG. 13C).

A path of the reproduction signals (10A+10D) and (10B+10C) are switched in a time division manner according to a switching operation of the switch 23 based on the switching signal 30G (see FIG. 13D). Specifically, a path on the attenuator 41 side is selected in periods corresponding to the writing waveforms S1 and short periods before and after the periods and a path on the amplifier 22 side is selected in periods other than the periods, that is, periods corresponding to waveforms of portions excluding waveforms of portions adjacent to the writing waveforms S1 in the readout waveforms S2. In this case, the attenuator 41 is gradually switched, for each of the writing waveforms S1, from the attenuator (ATT7) having a smallest attenuation to the attenuators (ATT8, ATT9, and ATT10) having larger attenuations according to the attenuation control signal 30I. Thus, the writing waveforms S1 and waveforms of portions adjacent to the writing waveforms S1 in the readout waveforms S2 are attenuated by an attenuation amount corresponding to each attenuation level by the attenuator 41. On the other hand, waveforms of portions excluding the waveforms of the portions adjacent to the writing waveforms S1 in the readout waveforms S2 are amplified by a fixed amount by the amplifier 22 (see FIGS. 10C to 10F).

Subsequently, after high-frequency components are attenuated by the low-pass filter 26 (see FIGS. 11A to 11D), the switch outputs 23A and 23B are amplified to the gain control level G by the gain controller 24. In this case, the operator 25 calculates, on the basis of the controlled output 24A and 24B, an attenuation amount (a lower limit attenuation amount) at the time when the amplification amount ΔG necessary for amplifying the filter outputs 26A and 26B to the gain control level G starts to be saturated and an attenuation amount (an upper limit attenuation amount) at the time when the amplification amount ΔG is completely saturated. The operator 25 generates the attenuation control signal 30 for controlling an attenuation amount to be an attenuation amount between the lower limit attenuation amount and the upper limit attenuation amount (e.g., an attenuation amount at the time of ATT9) and inputs the attenuation control signal 30I to the attenuator 41. Then, an attenuator of the attenuator 41 is fixed to the attenuator ATT9.

Figure 12:
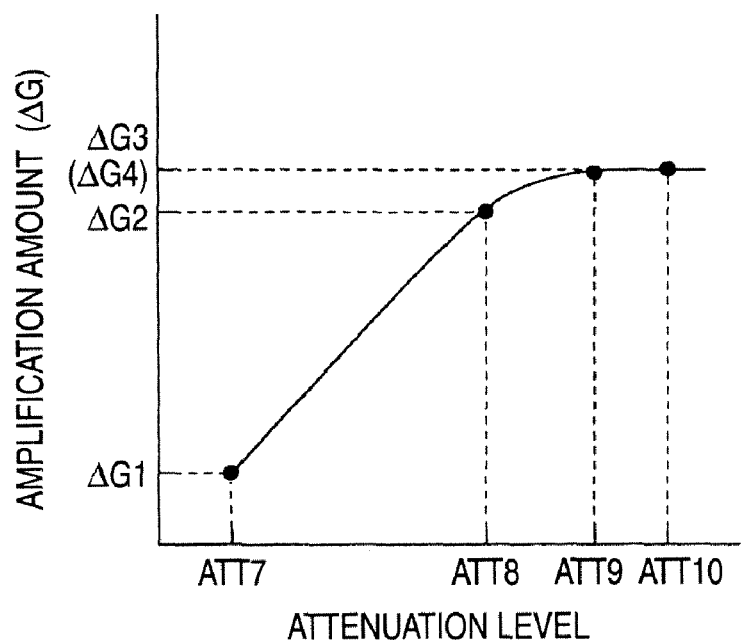
FIG. 12 is a graph for explaining a relation between an attenuation level and an amplification amount.

Here, "when the amplification amount ΔG starts to be saturated" means the time when a direct proportional relation between an attenuation level and the amplification amount ΔG starts to be broken (at the time of ATT8 in FIG. 12) when the attenuation level is gradually increased in FIG. 12. "When the amplification amount ΔG is completely saturated" means the time when the amplification amount ΔG rarely changes (at the time of ATT10 in FIG. 12).

Subsequently, in a state in which the attenuator of the attenuator 41 is fixed to the attenuator ATT9 and the function of the low-pass filter 26 is off, actual recording data is written in the optical disk 100. Specifically, first, the control unit 30 generates the laser drive signal 30D corresponding to the recording data and outputs the laser drive signal 30D to the laser 11 (see FIG. 13A). Then, the laser 11 is driven to emit light on the basis of the laser drive signal 30D from the control unit 30. A laser beam of the writing level several times as intense as the readout level and a laser beam of the readout level are alternately irradiated on the grove 114 for recording from the substrate 110 side. Thus, the laser beams are absorbed by the organic coloring matter included in the recording layer 111, causing local heat generation. The substrate 110 is deformed by the heat generation. As a result, the concave section 114A and the convex section 114B are formed in the groove 114 (see FIG. 13B). In this way, the actual recording data is written in the optical disk 100.

In this case, it is detected on a real time basis whether the recording data is accurately written in a predetermined area of the optical disk 100. Specifically, first, reflected light is absorbed by the photodetector 12 and converted into the reproduction signals (10A+10D) and (10B+10C) (see FIG. 13C).

A path of the reproduction signals (10A+10D) and (10B+10C) are switched in a time division manner according to a switching operation of the switch 23 based on the switching signal 30G (see FIG. 13D). Specifically, a path on the attenuator 41 side is selected in periods corresponding to the writing waveforms S1 and short periods before and after the periods and a path on the amplifier 22 side is selected in periods other than the periods, that is, periods corresponding to waveforms of portions excluding waveforms of portions adjacent to the writing waveforms S1 in the readout waveforms S2. In this case, since the attenuator 41 is fixed to an attenuator of an attenuation level 3, the writing waveforms S1 and the waveforms of the portions adjacent to the writing waveforms S1 in the readout waveforms S2 are attenuated by the attenuator of the attenuation level 3. On the other hand, the waveforms of the portions excluding the waveforms of the portions adjacent to the writing waveforms S1 in the readout waveforms S2 are amplified by a fixed amount by the amplifier 22 (see FIG. 13E). As a result, an amplitude level of the writing waveforms S1 attenuated by the attenuator 41 is substantially equal to an amplitude level of the readout waveforms S2 amplified by the amplifier 22.

Subsequently, the switch outputs 23A and 23B are transmitted through the low-pass filter 26 in the off state and inputted to the gain controller 24 as the filter outputs 26A and 26B (see FIG. 13F). The filter outputs 26A and 26B are amplified to the gain control level G by the gain controller 24 (see FIG. 13G). The controlled outputs 24A and 24B amplified are inputted to the operator 25.

The operator 25 generates the RF signal 20A, the focus error signal 20B, the tracking error signal 20C, and the push-pull signal 20D on the basis of the controlled outputs 24A and 24B and outputs these signals to the control unit 30.

The control unit 30 processes the RF signal 20A from the operator 25 to generate the recording data recorded in the optical disk 100. The control unit 30 processes the focus error signal 20B and the tracking error signal 20C from the operator 25 to generate the focus drive signal 30A, the tracking drive signal 30B, and the thread drive signal 30C.

Moreover, the control unit 30 processes the push-pull signal 20D to generate linear velocity and physical address information and generate the spindle drive signal 30E for controlling the spindle motor 40 from these kinds of information. Specifically, the control unit 30 detects a basic frequency of the push-pull signal 20D and calculates linear velocity on the basis of the basic frequency. The control unit 30 extracts the waveforms P1 by binarizing the push-pull signal 20D at a predetermined amplitude level (e.g., the slice level S in FIG. 13G) and then calculates physical address information from the waveforms P1 on the basis of a predetermined algorithm.

Consequently, in this embodiment, when the attenuator 41 attenuates an amplitude level of the writing waveforms S1 in the reproduction signals (10A+10D) and (10B+10C) outputted from the photodetector 12, the attenuator 41 subjects the writing waveforms S1 to attenuation processing using the attenuators ATT1 to ATT6 and the switch SW1. The attenuator 41 further subjects the writing waveforms S1, which are subjected to the attenuation processing, to the attenuation processing using, as the attenuation control signal 30I used for setting an attenuation amount, a control signal for controlling, when an attenuation amount of the attenuator 41 is gradually increased, the attenuation amount to be an attenuation amount between a lower limit attenuation amount at the time when an amplification amount necessary for amplifying the filter outputs 23B and 23D to the gain control level G starts to be saturated and an upper limit attenuation amount at the time when the amplification amount is completely saturated. Thus, it is possible to attenuate the writing waveforms S1 to a more optimum level. In particular, since an attenuation amount is set large in unstable portions at the time of rising of the writing waveforms S1, it is possible to input a stable waveform to the gain controller 24. As a result, it is possible to improve address acquisition performance.

In this way, in this embodiment, it is possible to extremely easily select an optimum attenuation of an amplitude level of the writing waveforms S1. As a result, it is possible to extremely stably and accurately detect physical address information in the groove 114.

The invention has been explained by citing the embodiments. However, the invention is not limited to the embodiments and various modifications of the embodiments are possible.

For example, in the embodiments, the number of the attenuators included in the pre-stage of the attenuator 21 is set to six and the number of the attenuators included in the post-stage of the attenuator 21 is set to four. However, it is preferable to increase, decrease, or otherwise adjust the number of the attenuators as appropriate according to a waveform of the reproduction signal (10A+10D).

In the embodiments, the amplifier 22 is provided in parallel to the attenuator 21. However, when a noise level is sufficiently lower than an amplitude level of readout waveforms, the amplifier 22 may be removed and wiring without amplification may be provided in parallel to the attenuator 21.

Figure 14:
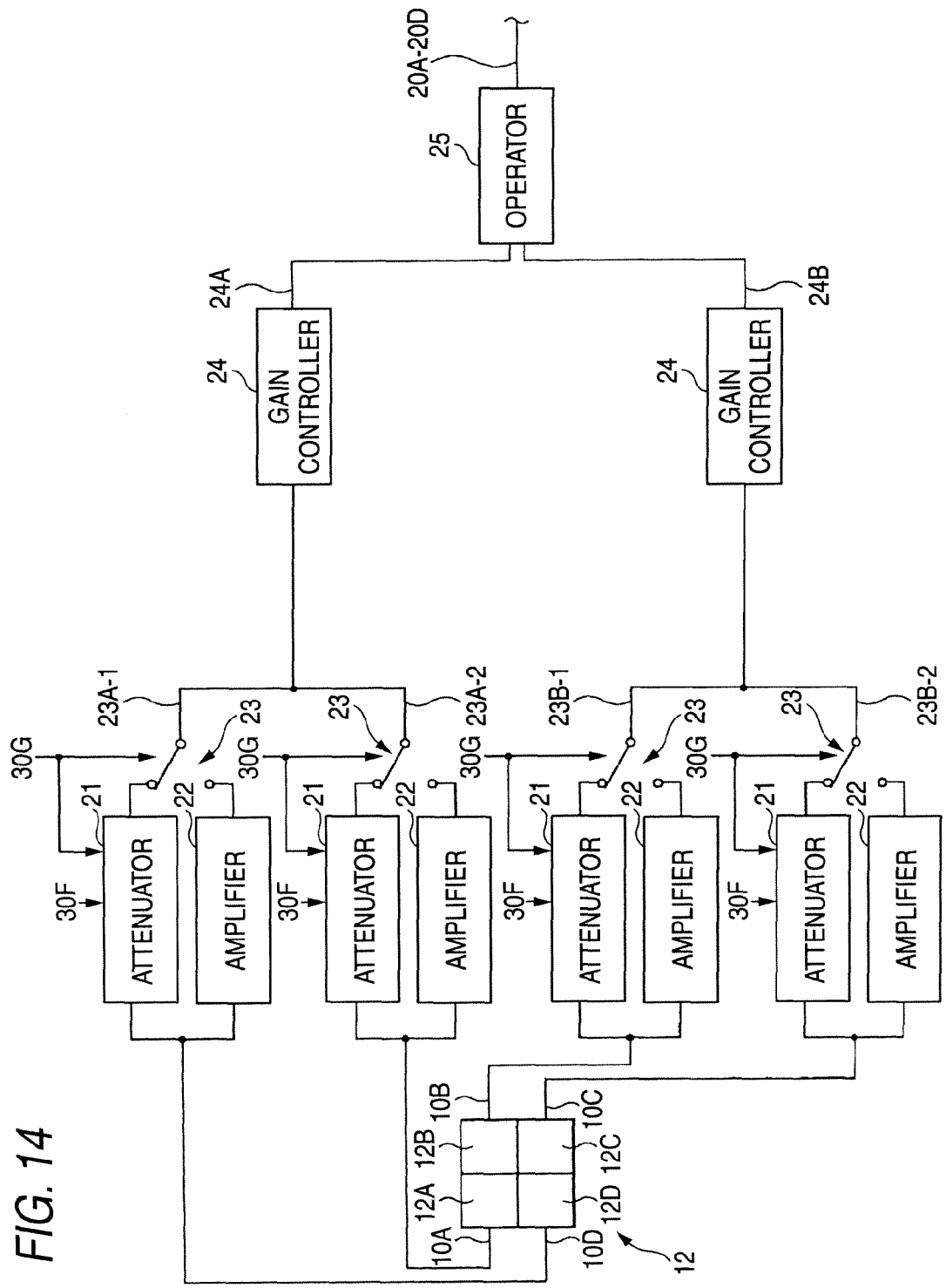
FIG. 14 is a diagram of a modification of the optical disk drive device in FIG. 1.
Figure 15:
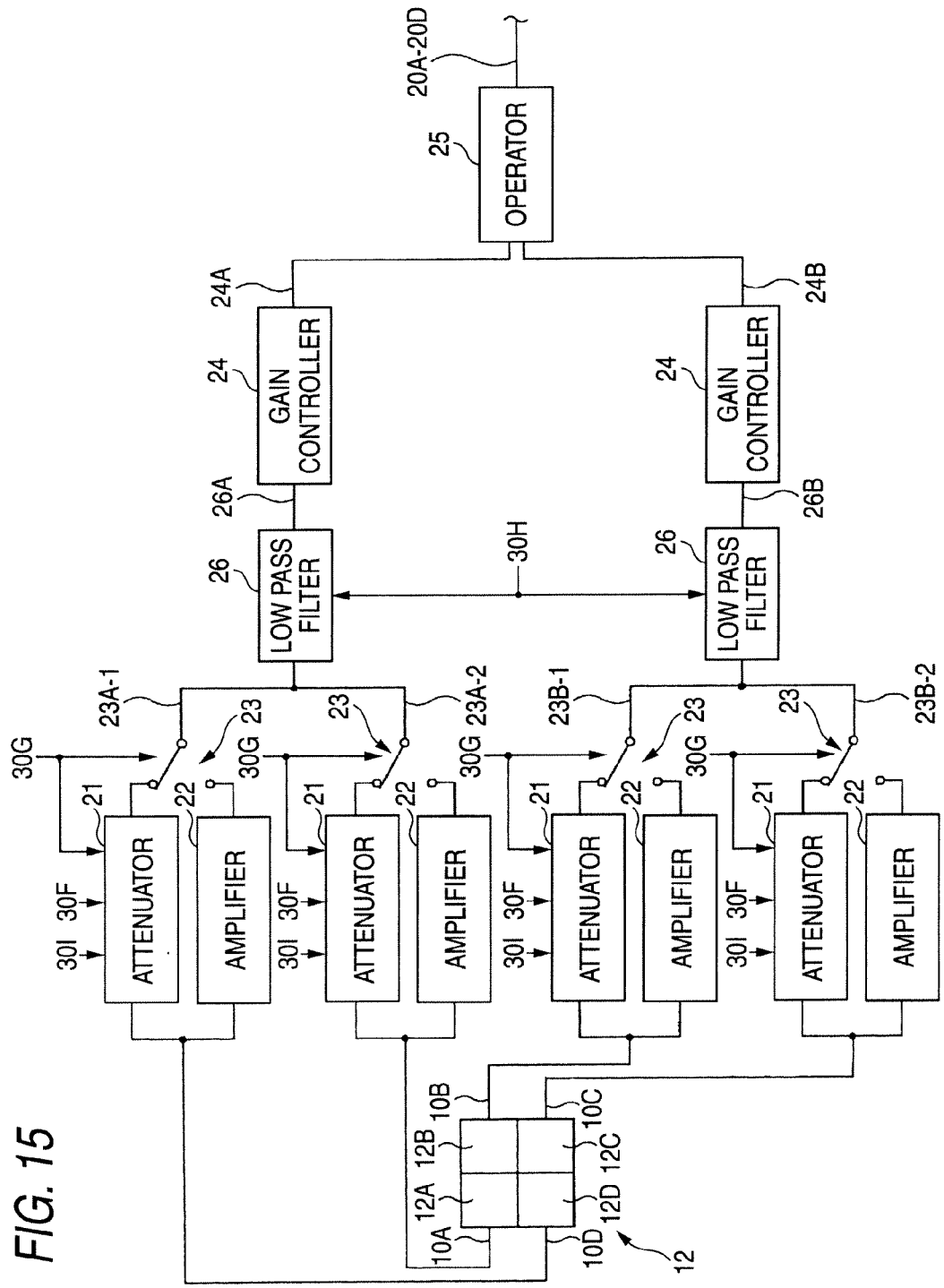
FIG. 15 is a diagram of a modification of the optical disk drive device in FIG. 8.

In the embodiments, outputs (reproduction signals) of the photodetector 12 are combined as 10A+10D and 10B+10C and then inputted to the attenuator 21 and the amplifier 22. However, as shown in FIGS. 14 and 15, the outputs 10A, 10B, 10C, and 10D may be separately inputted to the attenuator 21 and the amplifier 22.

It should be understood by those skilled in the art that various modifications, combinations, sub-combinations, and alterations may occur depending on design requirements and other factors insofar as they are within the scope of the appended claims or the equivalents thereof.

What is claimed is:

1. An attenuation-amount adjusting circuit comprising:
a light irradiating unit that alternately irradiates a laser beam of a writing level and a laser beam of a readout level on an optical disk that has a groove formed by a wobble pattern and plural markers indicating physical positions in the groove;
a light receiving unit that receives reflected light of the laser beam irradiated on the optical disk and converts the reflected light into a reproduction signal which includes a writing waveform and a readout waveform; and
a writing-waveform attenuating unit that determines a position of a rising edge of the writing waveform corresponding to a beginning of a pit of the groove, the writing waveform corresponding to the reflected light of the laser beam of the writing level in the reproduction signal, the writing-waveform attenuation unit including a plurality of attenuators, a first one of the plurality of attenuators is configured to attenuate an amplitude level of the writing waveform in the reproduction signal at a first level of attenuation, and a second one of the plurality of attenuators is configured to attenuate the amplitude level of the writing waveform in the reproduction signal at a second level of attenuation different from the first level of attenuation according to the determined position of the rising edge of the writing waveform.

2. An attenuation-amount adjusting circuit according to claim 1, wherein the writing-waveform attenuating unit attenuates the amplitude level of the writing waveform while gradually reducing an attenuation amount over time according to the position from the rising edge of the writing waveform.

3. An attenuation-amount adjusting circuit according to claim 1, wherein
the writing-waveform attenuating unit further attenuates, on the basis of an attenuation amount control signal, the amplitude level of the writing waveform attenuated, and
the attenuation-amount adjusting circuit further includes:
a high-frequency attenuating unit that attenuates a high-frequency component of the reproduction signal, the writing waveform of which is attenuated;
an amplifying unit that amplifies the amplitude level of the reproduction signal, the high-frequency component of which is attenuated, to a predetermined level; and
an attenuation-control-signal generating unit that generates an attenuation amount control signal for controlling, when an attenuation amount of the writing-waveform attenuating unit is gradually increased, the attenuation amount to be an attenuation amount between an attenuation amount at the time when an amplification amount of the amplifying unit starts to be saturated and an attenuation amount at the time when the amplification amount is saturated.

4. An attenuation-amount adjusting circuit according to claim 3, wherein the high-frequency attenuating unit attenuates a high-frequency component of the writing waveform included in the reproduction signal converted from the reflected light of the laser beam by the light-receiving unit.

5. An attenuation-amount adjusting circuit according to claim 1, further comprising:
a readout-waveform amplifying unit that amplifies an amplitude level of a readout waveform corresponding to the reflected light of the laser beam of the readout level in the reproduction signal.

6. An optical disk drive device comprising:
an attenuation-amount adjusting circuit; and
an address-information detecting circuit, wherein
the attenuation-amount adjusting circuit includes:
a light irradiating unit that alternately irradiates a laser beam of a writing level and a laser beam of a readout level on an optical disk that has a groove formed by a wobble pattern and plural markers indicating physical positions in the groove;

a light receiving unit that receives reflected light of the laser beam irradiated on the optical disk and converts the reflected light into a reproduction signal which includes a writing waveform and a readout waveform; and a writing-waveform attenuating unit that determines a position of a rising edge of the writing waveform corresponding to a beginning of a pit of the groove, the writing waveform corresponding to the reflected light of the laser beam of the writing level in the reproduction signal, the writing-waveform attenuation unit including a plurality of attenuators, a first one of the plurality of attenuators is configured to attenuate an amplitude level of the writing waveform in the reproduction signal at a first level of attenuation, and a second one of the plurality of attenuators is configured to attenuate the amplitude level of the writing waveform in the reproduction signal at a second level of attenuation different from the first level of attenuation according to the determined position of the rising edge of the writing waveform, and the address-information detecting circuit includes an address-information acquiring unit that extracts signal components corresponding to the markers from the reproduction signal attenuated by the writing-waveform attenuating unit and acquires physical address information in the groove.

7. An optical disk drive device according to claim 6, wherein the attenuation-amount adjusting circuit further includes:

a high-frequency attenuating unit that attenuates a high-frequency component of the reproduction signal, the writing waveform of which is attenuated; and an amplifying unit that amplifies the amplitude level of the reproduction signal, the high-frequency component of which is attenuated, to a predetermined level, the address-information detecting circuit further includes:

an attenuation-control-signal generating unit that generates an attenuation amount control signal for controlling, when an attenuation amount of the writing-waveform attenuating unit is gradually increased, the attenuation amount to be an attenuation amount between an attenuation amount at the time when an amplification amount of the amplifying unit starts to be saturated and an attenuation amount at the time when the amplification amount is saturated; and a driving-control-signal generating unit that generates a driving control signal for turning on and off a function of the high-frequency attenuating unit when the address-information acquiring unit extracts the signal components corresponding to the markers, and the address-information acquiring unit extracts the signal components corresponding to the markers from the reproduction signal amplified by the amplifying unit and acquires physical address information in the groove.

8. An attenuation-amount adjusting method, implemented on an attenuation-amount adjusting device, comprising the steps of:

driving to rotate an optical disk having a groove formed by a wobble pattern and plural markers indicating physical positions in the groove;

alternately irradiating a laser beam of a writing level and a laser beam of a readout level on the rotating optical disk;

receiving reflected light of the laser beam irradiated on the optical disk and converting the reflected light into a reproduction signal which includes a writing waveform and a readout waveform; and determining a position of a rising edge of the writing waveform corresponding to a beginning of a pit of the groove, the writing waveform corresponding to the reflected light of the laser beam of the writing level in the reproduction signal, attenuating, with a first attenuator, an amplitude level of the writing waveform in the reproduction signal at a first level of attenuation, and attenuating, with a second attenuator, the amplitude level of the writing waveform in the reproduction signal at a second level of attenuation different from the first level of attenuation according to the determined position of the rising edge of the writing waveform.

9. An address-information acquiring method, implemented on an attenuation-amount adjusting device, comprising the steps of:

driving to rotate an optical disk having a groove formed by a wobble pattern and plural markers indicating physical positions in the groove;

alternately irradiating a laser beam of a writing level and a laser beam of a readout level on the rotating optical disk;

receiving reflected light of the laser beam irradiated on the optical disk and converting the reflected light into a reproduction signal which includes a writing waveform and a readout waveform;

determining a position of a rising edge of the writing waveform corresponding to a beginning of a pit of the groove, the writing waveform corresponding to the reflected light of the laser beam of the writing level in the reproduction signal, attenuating, with a first attenuator, an amplitude level of the writing waveform in the reproduction signal at a first level of attenuation, and attenuating, with a second attenuator, the amplitude level of the writing waveform in the reproduction signal at a second level of attenuation different from the first level of attenuation according to the determined position of the rising edge of the writing waveform; and extracting signal components corresponding to the markers from the reproduction signal attenuated and acquiring physical address information in the groove.

10. An attenuation-amount adjusting circuit according to claim 1, wherein the plurality of attenuators attenuate the writing waveform based on a driving signal.

11. An attenuation-amount adjusting circuit according to claim 10, wherein each of the plurality of attenuators attenuate the writing waveform at different respective attenuation levels which correspond to a magnitude of the amplitude level of the writing waveform.

12. An attenuation-amount adjusting circuit according to claim 10, wherein one of the plurality of attenuators attenuates the writing waveform at a greater attenuation near the rising edge of the writing waveform than the attenuation provided by the other attenuators.

13. An attenuation-amount adjusting circuit according to claim 1, wherein the pit of the groove is a concave section of the groove formed by irradiation of the laser beam of the writing level.

14. An attenuation-amount adjusting circuit according to claim 1, wherein the plurality of attenuators sequentially attenuate the writing waveform in the reproduction signal.

15. An attenuation-amount adjusting circuit according to claim 5, wherein the readout-waveform amplifying unit only amplifies the amplitude level of the readout waveform corresponding to the reflected light of the laser beam of the readout level in the reproduction signal.

* * * * *